US008841390B2

(12) United States Patent
Leskinen et al.

(10) Patent No.: US 8,841,390 B2
(45) Date of Patent: Sep. 23, 2014

(54) METHOD FOR IMPROVING FLOWABILITY OF HETEROPHASIC POLYPROPYLENE POWDER

(75) Inventors: Pauli Leskinen, Helsinki (FI); Olli Tuominen, Helsinki (FI); Veli-Matti Keinänen, Vantaa (FI)

(73) Assignee: Borealis AG, Vienna (AT)

( * ) Notice: Subject to any disclaimer, the term of this patent is extended or adjusted under 35 U.S.C. 154(b) by 558 days.

(21) Appl. No.: 12/998,704

(22) PCT Filed: Nov. 18, 2009

(86) PCT No.: PCT/EP2009/065384
§ 371 (c)(1),
(2), (4) Date: Jun. 27, 2011

(87) PCT Pub. No.: WO2010/057915
PCT Pub. Date: May 27, 2010

(65) Prior Publication Data
US 2011/0294940 A1 Dec. 1, 2011

(30) Foreign Application Priority Data
Nov. 21, 2008 (EP) .................................... 08169602

(51) Int. Cl.
*C08L 23/12* (2006.01)
*C08L 23/16* (2006.01)

(52) U.S. Cl.
USPC ............. 526/66; 524/451; 524/502; 524/528; 525/53; 525/240; 525/191; 525/241; 526/79; 526/351

(58) Field of Classification Search
USPC ............. 526/66, 79, 351; 524/451, 502, 528; 525/53, 240, 241, 191
See application file for complete search history.

(56) References Cited

U.S. PATENT DOCUMENTS

| 4,739,015 | A | 4/1988 | Toyota et al. | |
|---|---|---|---|---|
| 6,342,564 | B1 * | 1/2002 | Pitkanen et al. | 525/191 |
| 6,723,829 | B1 * | 4/2004 | Malm et al. | 528/481 |
| 7,279,526 | B2 * | 10/2007 | Malm et al. | 525/191 |
| 8,394,893 | B2 * | 3/2013 | Vestberg et al. | 525/240 |

FOREIGN PATENT DOCUMENTS

| EP | 0 424 145 | 4/1991 |
|---|---|---|
| EP | 0 586 390 | 5/1997 |
| EP | 0 887 379 | 12/1998 |
| EP | 1 477 525 | 11/2004 |
| EP | 1 598 377 | 11/2005 |
| EP | 1 935 938 | 6/2008 |
| WO | WO 92/12182 | 7/1992 |
| WO | WO 98/12234 | 3/1998 |
| WO | WO 99/24478 | 5/1999 |
| WO | WO 99/24479 | 5/1999 |
| WO | WO 00/68315 | 11/2000 |
| WO | WO 2004/000899 | 12/2003 |
| WO | WO 2004/111095 | 12/2004 |

OTHER PUBLICATIONS

Tetsuo Hayashi et. al., "Heptad Configuration Analysis of 13 C n.m.r. Spectra in Highly Isotactic Polypropylene", Polymer, Jan. 1988, pp. 138-143, vol. 29, Butterworth & Co. (Publishers) Ltd.
Riichiro Chujo et. al., "Two-Site Model Analysis of 13 C n.m.r. of Polypropylene Polymerized by Ziegler-Natta Catalyst with External Alkoxysilane Donors", Polymer, 1994, pp. 339-342, vol. 35, No. 2, Butterworth-Heinemann Ltd.
B.B. Baker, Jr. et al., "Confromation of Ethylene/Propylene Copolymers (Random or Block) as seen by 13 C n.m.r. IR and Thermal Methods", Presented at 18th Annual NATAS Conference, Sep. 24-27, 1989, Elsevier Science Publishers B.V., San Diego, CA, U.S.A.

* cited by examiner

*Primary Examiner* — Robert D. Harlan
(74) *Attorney, Agent, or Firm* — Warn Partners, P.C.

(57) ABSTRACT

Method for the preparation of a sticky high impact heterophasic polypropylene (HECO) in a reactor facility comprising in series (i) a first reaction system, (ii) a first conveying line connecting the first reactor system with a second reactor system comprising an outlet, (iii) a second conveying line connecting the outlet with a purge bin comprising a feeder, and (iv) a conveying system being connected with the feeder, and the preparation of said heterophasic polypropylene (HECO) comprises the steps in the order of (a) producing in said first reactor system the polypropylene matrix (M), (b) transferring at least a part of said polypropylene to said second reactor system via the first conveying line, (c) producing in said second reactor system the elastomeric copolymer obtaining the heterophasic polypropylene (HECO), (d) discharging said heterophasic polypropylene (HECO) from said second reactor system via the outlet, (e) transferring said discharged heterophasic polypropylene (HECO) via the second conveying line to said purge bin comprising said feeder, and (f) transferring further said discharged heterophasic polypropylene (HECO) from said purge bin via said feeder to said conveying system, the produced heterophasic polypropylene (HECO) is provided with an additive, said additive is fed to the produced heterophasic polypropylene (α) at the outlet of the second reactor system, or (β) at the feeder (F) of the purge bin (PB).

23 Claims, 4 Drawing Sheets

METHOD FOR IMPROVING FLOWABILITY OF HETEROPHASIC POLYPROPYLENE POWDER

This application is a National Stage of International Application No. PCT/EP2009/065384, filed Nov. 18, 2009. This application claims priority to European Patent Application No. 08169602.3, filed on Nov. 21, 2008. The disclosures of the above applications are incorporated herein by reference.

The present invention relates to a new method for the preparation of a heterophasic polypropylene (HECO).

Many applications require a balance of stiffness and good impact behaviour. In such cases quite often the heterophasic polypropylene (HECO) is the material of choice. The heterophasic polypropylene (HECO) is a polymer having a matrix phase and a dispersed phase. The matrix phase is usually a propylene homopolymer or copolymer and the dispersed phase is often an elastomeric material, like propylene copolymer comprising ethylene and/or other higher $\alpha$-olefin(s). In some demanding applications advanced high impact materials are desired. High impact levels are only achieved with a heterophasic polypropylene (HECO) containing rather high amounts of elastomeric material. One detrimental side effect of such high amounts of elastomeric material is that the heterophasic polypropylene powder (HECO) gets sticky. Sticky material tends to agglomerate and leading to sheeting in the transfer lines, hoppers and vessels. In severe cases the heterophasic polypropylene powder (HECO) may also cause blocking of the system. This stickiness problem occurs in particular in the bottom of the purge bin, the rotary feeder and the conveying line to the extruder or to the powder bin as well as in the powder bin itself. In other words the stickiness problem is in particular imminent before the heterophasic polypropylene powder (HECO) has been extruded to pellets.

U.S. Pat. No. 4,739,015 provides a process of a heterophasic polymer material in which the flowability of the particles is improved by the feed of an oxygen-containing compound being gaseous in standard condition to the random copolymerization reaction system. U.S. Pat. No. 4,739,015 does not provide an alternative to reduce the stickiness without impairing the polymerization as such.

EP 0 424 145 A2 defines a process which enables to improve the flowability of a heterophasic system. In this process the catalyst components must undergo a milling step.

Accordingly the object of the present invention is to provide a process for the preparation of a high impact heterophasic polypropylene (HECO) in which the polymer can be easily conveyed from the polymerisation unit to the extrusion unit.

The finding of the present invention is that a heterophasic polypropylene (HECO), i.e. a heterophasic polypropylene powder (HECO), being sticky due to the high elastomeric content must be surface coated with an additive after the polymerisation before it is conveyed to other units of the polymerization facility.

Accordingly the present invention is directed to a method for the preparation of a heterophasic polypropylene (HECO) in a reactor facility, wherein (A) the reactor facility comprises in series
   (i) a first reactor system ($1^{st}$ RS) comprising at least a slurry reactor (SR) and/or at least one gas phase reactor (GPR),
   (ii) a first conveying line (CL 1) connecting the first reactor system ($1^{st}$ RS) with a second reactor system ($2^{nd}$ RS),
   (iii) the second reactor system ($2^{nd}$ RS) comprising at least one gas phase reactor (GPR) and an outlet (O),
   (iv) a second conveying line (CL 2) connecting the outlet (O) of the second reactor system ($2^{nd}$ RS) with a purge bin (PB) comprising a feeder (F),
   (v) a conveying system (C) optionally comprising a powder silo (PS),
   (vi) the conveying system (C) being connected with the feeder (F) of the purge bin (PB), and
   (vii) optionally an extruder (E) connected with the conveying system (C),
(B) the preparation of said heterophasic polypropylene (HECO) comprises the steps in the order of
   (a) producing in said first reactor system ($1^{st}$ RS) the polypropylene matrix (M),
   (b) transferring at least a part of said polypropylene matrix (M), preferably at least 90 wt.-% of said polypropylene matrix (M), to said second reactor system ($2^{nd}$ RS) via the first conveying line (CL 1),
   (c) producing in said second reactor system ($2^{nd}$ RS) in the presence of said polypropylene matrix (M) the elastomeric copolymer (E) obtaining the heterophasic polypropylene (HECO),
   (d) discharging said heterophasic polypropylene (HECO) from said second reactor system ($2^{nd}$ RS) via the outlet (O),
   (e) transferring said discharged heterophasic polypropylene (HECO) via the second conveying line (CL 2) to said purge bin (PB) comprising said feeder (F), and
   (f) transferring further said discharged heterophasic polypropylene (HECO) from said purge bin (PB) via said feeder (F) to said conveying system (C), optionally to said powder silo (PS) of the conveying system (C),
   (g) optionally extruding the heterophasic polypropylene (HECO) in the extruder (E) to pellets,
(C) the produced heterophasic polypropylene (HECO) is provided with an additive (A), said additive (A) is fed to the produced heterophasic polypropylene (HECO)
   ($\alpha$) at the outlet (O) of the second reactor system ($2^{nd}$ RS), and/or
   ($\beta$) at the purge bin (PB), preferably at the conical part of the purge bin (PB), and/or
   ($\gamma$) at the feeder (F), i.e. at the rotary feeder, preferably at the conical part of the feeder (F), i.e. at the conical part of the rotary feeder, of the purge bin (PB), and/or
   ($\delta$) at the powder silo (PS), preferably at the conical part of the powder silo (PS), and/or
   ($\epsilon$) at the second conveying line (CL 2) between the outlet (O) and the purge bin (PB), and/or
   ($\zeta$) at the conveying system (C) between the feeder (F) and the powder silo (PS), and
(D) the produced heterophasic polypropylene (HECO) after being treated with the additive (A), i.e. after having left the powder silo (PS) and/or the purge bin (PB),
   (i) has a xylene cold soluble fraction (XCS) of at least 15 wt.-% and
   (ii) comprises a polypropylene matrix (M) and dispersed therein an elastomeric copolymer (E), According to a specific embodiment the present invention is directed to a method for the preparation of a heterophasic polypropylene (HECO) in a reactor facility wherein (A) the reactor facility comprises in series
   (i) a first reactor system ($1^{st}$ RS) comprising at least a slurry reactor (SR) and/or at least one gas phase reactor (GPR),
   (ii) a first conveying line (CL 1) connecting the first reactor system ($1^{st}$ RS) with a second reactor system ($2^{nd}$ RS),
   (iii) the second reactor system ($2^{nd}$ RS) comprising at least one gas phase reactor (GPR) and an outlet (O), (iv) a second conveying line (CL 2) connecting the outlet (O) of the second reactor system ($2^{nd}$ RS) with a purge bin (PB) comprising a feeder (F),
(v) a conveying system (C) optionally comprising a powder silo (PS),
(vi) the conveying system (C) being connected with the feeder (F) of the purge bin (PB), and
(vii) optionally an extruder (E) connected with the conveying system (C),
(B) the preparation of said heterophasic polypropylene (HECO) comprises the steps in the order of
(a) producing in said first reactor system ($1^{st}$ RS) the polypropylene matrix (M),
(b) transferring at least a part of said polypropylene (M), preferably at least 90 wt.-% of said polypropylene (M), to said second reactor system ($2^{nd}$ RS) via the first conveying line (CL 1),
(c) producing in said second reactor system ($2^{nd}$ RS) in the presence of said polypropylene (M) the elastomeric copolymer (E) obtaining the heterophasic polypropylene (HECO),
(d) discharging said heterophasic polypropylene (HECO) from said second reactor system ($2^{nd}$ RS) via the outlet (O),
(e) transferring said discharged heterophasic polypropylene (HECO) via the second conveying line (CL 2) to said purge bin (PB) comprising said feeder (F), and
(f) transferring further said discharged heterophasic polypropylene (HECO) from said purge bin (PB) via said feeder (F) to said conveying system (C), optionally to said powder silo (PS) of the conveying system (C),
(g) optionally extruding the heterophasic polypropylene (HECO) in the extruder (E) to pellets,
(C) the produced heterophasic polypropylene (HECO) is provided with an additive (A), said additive (A) is fed to the produced heterophasic polypropylene (HECO)
(α) at the outlet (O) of the second reactor system ($2^{nd}$ RS), and/or
(β) at the purge bin (PB), preferably at the conical part of the purge bin (PB), and/or
(γ) at the feeder (F), preferably at the conical part of the feeder (F), of the purge bin (PB), and/or
(δ) at the second conveying line (CL 2) between the outlet (O) and the purge bin (PB),
and
(D) the produced heterophasic polypropylene (HECO) after being treated with the additive (A), i.e. after having left the purge bin (PB) via the feeder (F),
(i) has a xylene cold soluble fraction (XCS) of at least 15 wt.-% and
(ii) comprises a polypropylene matrix (M) and dispersed therein an elastomeric copolymer (E).

It has been surprisingly found out that the addition of an additive (A) after the polymerization of the elastomeric phase but before leaving the powder silo (PS), in particular before leaving the purge bin (PB), reduces the stickiness problems and increases significantly the flowability of the heterophasic polypropylene (HECO), i.e. of the heterophasic polypropylene powder (HECO), in the transfer lines (see FIGS. 1 and 2).

BRIEF DESCRIPTION OF THE SEVERAL VIEWS OF THE DRAWINGS The present invention will become more fully understood from the detailed description and the accompanying drawings, wherein.

Figure 1:
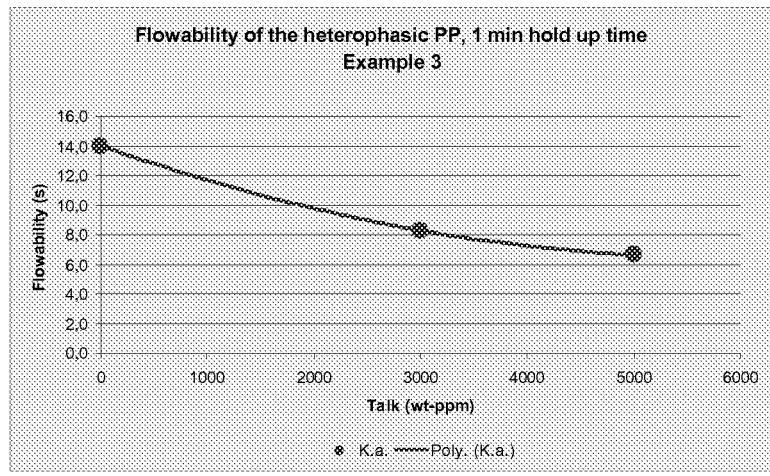
FIG. 1 is a graph depicting flowability behaviors of heterophasic polypropylene of Example 3.
Figure 2:
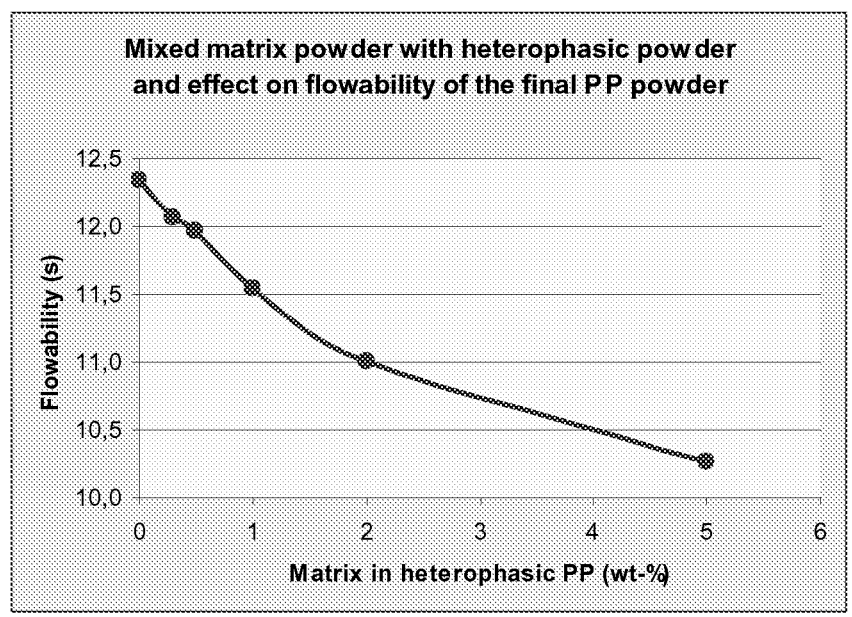
FIG. 2 is a graph depicting flowability behaviors of mixed matrix powder with heterophasic polypropylene powder.
Figure 3:
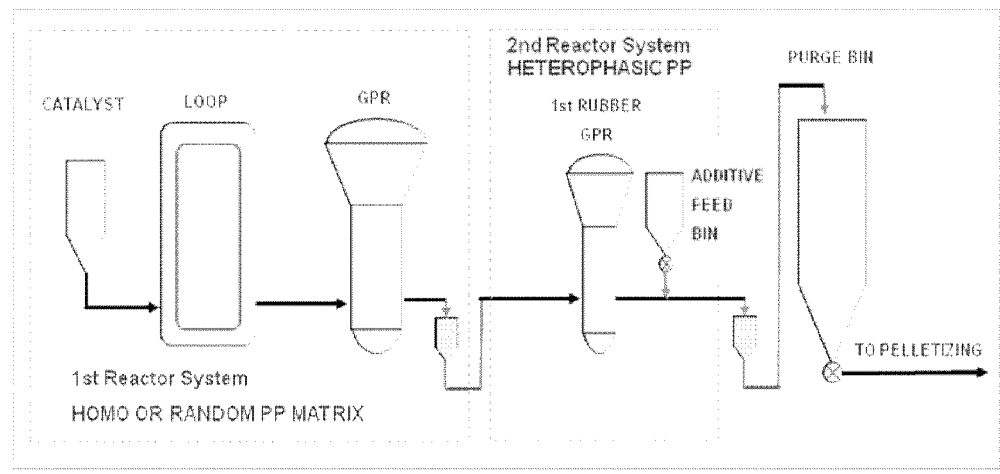
FIG. 3 is a schematic illustrating a first reactor system, second reactor system, purge bin, and conveying system arrangement for the preparation of a heterophasic polypropylene.
Figure 4:
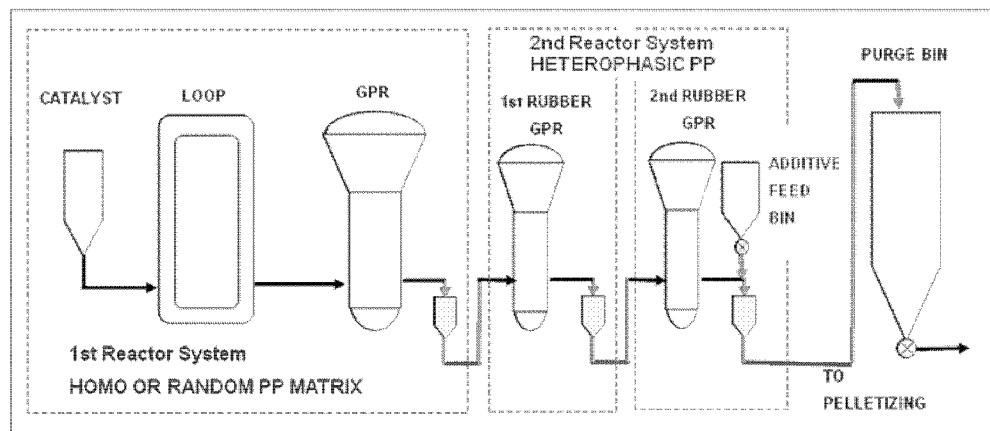
FIG. 4 is a schematic illustrating a first reactor system, second reactor system, purge bin, and conveying system arrangement for the preparation of a heterophasic polypropylene.

In the following the invention will be described in more detail. First the hetereophasic polypropylene (HECO) produced according to the inventive process will be defined more precisely.

Throughout the present invention, whenever the properties of the hetereophasic polypropylene (HECO) are described, the properties of the hetereophasic polypropylene (HECO) are meant which has been already treated with the additive (A). Accordingly whenever the properties of the hetereophasic polypropylene (HECO) are described, preferably the properties of the hetereophasic polypropylene (HECO) are meant which has left the powder silo (PS), preferably which has left the feeder (F) of the purge bin (PB), of the process facility, in case not otherwise defined.

The process of the invention is suitable for any hetereophasic polypropylene (HECO), in particular to a hetereophasic polypropylene (HECO) with a high xylene cold soluble fraction (XCS). Accordingly the present invention is directed to the preparation of the hetereophasic polypropylene (HECO) having a xylene cold soluble fraction (XCS) of at least 15 wt.-%, more preferably of at least 20 wt.-%, yet more preferably of at least 25 wt.-%, still more preferably of at least 30 wt.-%, like of at least 35 wt.-%. Thus the xylene cold soluble fraction (XCS) of the hetereophasic polypropylene (HECO) is preferably in the range of 20 to 55 wt.-%, more preferably in the range of 25 to 50 wt.-%, like 30 to 45 wt.-%.

Such a high impact hetereophasic polypropylene (HECO) is further featured by a rather low intrinsic viscosity (IV) of the elastomeric phase (E), i.e. the xylene cold soluble fraction (XCS). Accordingly it is appreciated that the intrinsic viscosity of the xylene cold soluble fraction (XCS) of the heterophasic polypropylene composition is equal or below 3.0 dl/g, more preferably equal or below 2.2 dl/g, yet more preferably equal or below 1.9 dl/g, like equal or below 1.6 dl/g. On the other hand the intrinsic viscosity should be not too low. Accordingly the intrinsic viscosity of the xylene cold soluble fraction (XCS) of the heterophasic polypropylene (HECO) is preferably in the range of 1.1 to 3.0 dl/g, more preferably in the range 1.2 to 2.0 dl/g, like 1.2 to 1.9 dl/g. The intrinsic viscosity is measured according to ISO 1628 in decaline at 135° C.

The prepared heterophasic polypropylene (HECO) is further specified by its individual components. As stated above the heterophasic polypropylene (HECO) must comprise the polypropylene matrix (M) and the elastomeric copolymer (E) dispersed in said matrix. This however does not exclude the option that other polymers are present, in particular those which can also act as an impact modifier. However it is preferred that the heterophasic polypropylene (HECO) comprises the polypropylene matrix (M) and the elastomeric copolymer (E) and optionally a crystalline polyethylene as the only polymer components, i.e. no other polymers are present in the heterophasic polypropylene composition.

The process according to this invention is in particular operated in such a way that a specific ratio is kept between the polypropylene matrix (M) and the elastomeric copolymer (E). Accordingly it is appreciated that the heterophasic polypropylene (HECO) comprises
- 80 to 50 wt.-%, more preferably 75 to 55 wt.-%, of the polypropylene matrix (M) and
- 20 to 50 wt.-%, more preferably 25 to 45 wt.-%, of the elastomeric copolymer (E), based on the polypropylene matrix (M) and the elastomeric copolymer (E).

As explained above the heterophasic polypropylene (HECO) comprises a polypropylene matrix (M) in which the elastomeric copolymer (E) is dispersed. In the present invention the polypropylene matrix (M) can be a propylene homopolymer, a propylene copolymer or mixtures thereof. However it is preferred that the polypropylene matrix (M) is a propylene homopolymer.

Preferably the polypropylene matrix (M) is isotactic. Accordingly it is appreciated that the polypropylene matrix (M) has a rather high pentad concentration, i.e. higher than 90%, more preferably higher than 92%, still more preferably higher than 93% and yet more preferably higher than 95%, like higher than 98%.

The expression homopolymer used in the instant invention relates to a polypropylene that consists substantially, i.e. of at least 97 wt.-%, preferably of at least 98 wt.-%, more preferably of at least 99 wt.-%, still more preferably of at least 99.5 wt.-% of propylene units. In a preferred embodiment only propylene units in the propylene homopolymer are detectable. The comonomer content can be determined with FT infrared spectroscopy, as described below in the examples.

In case the polypropylene matrix (M) comprises or is a propylene copolymer, it is preferred that the propylene copolymer is a propylene random copolymer. The randomness indicates the amount of isolated comonomer units, i.e. those which have no other comonomer units in the neighbour, compared to the total amount of comonomers in the polymer chain. In a preferred embodiment, the randomness of the polypropylene matrix (M) being a propylene random copolymer is at least 30%, more preferably at least 50%, even more preferably at least 60%, and still more preferably at least 65%.

Where the polypropylene matrix (M) comprises a propylene copolymer or is random propylene copolymer, the copolymer comprises monomers copolymerizable with propylene, for example comonomers such as ethylene and/or $C_4$ to $C_{20}$ alpha-olefins, in particular ethylene and/or $C_4$ to $C_{10}$ alpha-olefins, e.g. 1-butene and/or 1-hexene. Preferably the propylene copolymer, i.e. the propylene random copolymer, comprises monomers copolymerizable with propylene from the group consisting of ethylene, 1-butene and 1-hexene. More specifically the propylene copolymer, i.e. the propylene random copolymer, comprises—apart from propylene—units derivable from ethylene and/or 1-butene. In a preferred embodiment the propylene copolymer, i.e. the propylene random copolymer, comprises units derivable from ethylene and propylene only. The comonomer content in the polypropylene matrix (M) (be it a propylene copolymer or a mixture of propylene homopolymer and propylene copolymer) is preferably rather low, i.e. equal or below 5.0 wt %, more preferably 0.5 to 5.0 wt.-%, like 1.0 to 5.0 wt %, still more preferably 1.0 to 4.0 wt %, yet more preferably 1.0 to 3.0 wt %.

Preferably the xylene cold soluble fraction (XCS) of the polypropylene matrix (M) is a rather low. Accordingly the polypropylene matrix (M) has preferably a xylene cold soluble fraction (XCS) measured according to ISO 6427 (23° C.) of not more than 5.0 wt-%, more preferably of not more than 4.0 wt.-%, yet more preferably of not more than 2.5 wt.-%. Thus a preferred range is 0.5 to 5.0 wt.-%, more preferred 1.0 to 4.0 wt.-%, still more preferred 1.2 to 2.5 wt.-%.

Further and preferably the polypropylene matrix (M) has a rather low melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the polypropylene (A) has an $MFR_2$ (230° C.) in a range of 0.05 to 200.0 g/10 min, more preferably of 0.5 to 150.0 g/10 min, still more preferably of 1.0 to 50.0 g/10 min, like 1.0 to 10.0.

The polypropylene matrix (M) can be unimodal or multimodal, like bimodal in view of the molecular weight distribution and/or the comonomer content distribution. Concerning the definition of unimodal and multimodal, like bimodal, it is referred to the definition below.

The expression "multimodal" or "bimodal" used herein refers to the modality of the polymer, i.e.
- the form of its molecular weight distribution curve, which is the graph of the molecular weight fraction as a function of its molecular weight, or
- the form of its comonomer content distribution curve, which is the graph of the comonomer content as a function of the molecular weight of the polymer fractions.

As will be explained below, the polymer components of the polypropylene matrix (M) can be produced in a sequential step process, using reactors in series configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the polypropylene matrix (M) being a propylene homopolymer may be multimodal or bimodal in view of the molecular weight. In turn the polypropylene matrix (M) being a propylene copolymer, like a propylene random copolymer, may be multimodal, like bimodal, in view of the comonomer content and/or molecular weight. It is in particular appreciated in case the polypropylene matrix (M) is a propylene copolymer, like a propylene random copolymer, that it is multimodal, like bimodal, in view of the comonomer content.

As a further component in the inventive process an elastomeric copolymer (E) is produced.

The elastomeric copolymer (E) comprise preferably units derived from
ethylene and
$C_3$ to $C_{20}$ α-olefin.

Preferably the elastomeric copolymer (E) comprises, preferably consists of, units derived from ethylene and at least one alpha-olefin comonomer selected from the group consisting of propylene, 1-butene, 1-pentene, 1-hexene, 1-heptene and 1-octene. Preferably the elastomeric copolymer (E) comprises at least units derived from ethylene and propylene and may comprise further units derived from α-olefins as defined in this paragraph. However it is in particular preferred that the elastomeric copolymer (E) comprises, more preferably consists of, propylene and ethylene as the only polymerizable units. Thus an ethylene-propylene rubber (EPR) as elastomeric copolymer (E) is most preferred.

Like the polypropylene matrix (M) the elastomeric copolymer (E) can be unimodal or multimodal, like bimodal. Concerning the definition of unimodal and multimodal, like bimodal, it is referred to the definition above.

The ethylene content in the elastomeric copolymer (E) is desirably relatively high, i.e. at least 20.0 wt.-% and/or up to 90.0 wt.-%, preferably 30.0 to 85.0 wt.-%, more preferably 40.0 to 82.0 wt.-%, yet more preferably 55.0 to 80 wt.-%. Preferably the elastomeric copolymer (B) is an ethylene-propylene rubber (EPR), in particular with an ethylene content as defined in this paragraph.

The above defined heterophasic polypropylene (HECO) is obtained in an at least two reactor system known in the art. Accordingly the reactor facility comprises in series
(i) a first reactor system ($1^{st}$ RS) comprising at least a slurry reactor (SR) and/or at least one gas phase reactor (GPR),
(ii) a first conveying line (CL 1) connecting the first reactor system ($1^{st}$ RS) with a second reactor system ($2^{nd}$ RS),
(iii) the second reactor system ($2^{nd}$ RS) comprising at least one gas phase reactor (GPR) and an outlet (O),
(iv) a second conveying line (CL 2) connecting the outlet (O) of the second reactor system ($2^{nd}$ RS) with a purge bin (PB) comprising a feeder (F),
(v) a conveying system (C) optionally comprising a purge silo (PS)
(vi) the conveying system (C) being connected with the feeder (F) of the purge bin (PB), and
(vii) optionally an extruder (E) connected with the conveying system (C), Accordingly the first reactor system ($1^{st}$ RS) must comprise a slurry reactor and/or a gas phase reactor (GPR). It is therefore in particular appreciated that the first reactor system ($1^{st}$ RS) comprises at least one slurry reactor and may comprise additional reactors, for instance a further slurry reactor and/or a gas phase reactor (GPR). In a preferred embodiment the first reactor system ($1^{st}$ RS) comprises, more preferably consist of, a slurry reactor (SR) which follows a gas phase reactor (GPR) (see FIGS. 3 to 6).

A slurry reactor (SR) according to this invention designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor (SR) comprises (is) a (bulk) loop reactor.

"Gas phase reactor" means any mechanically mixed or fluid bed reactor. Preferably the gas phase reactor comprises a mechanically agitated fluidized bed reactor with gas velocities of at least 0.2 msec.

The reaction conditions are well known in the art and not particular subject of this application. The reaction conditions are in particular chosen in such a way that the above defined properties of the heterophasic polypropylene are obtained.

In the first reactor system ($1^{st}$ RS) the polypropylene matrix (M) as defined above is produced.

For instance, in the slurry reactor (SR) the temperature is preferably from 40 to 110° C., preferably between 50 and 95° C., in particular between 60 and 90° C., with a pressure in the range of from 20 to 80 bar, preferably 30 to 60 bar, with the option of adding—if present—the comonomer and if desired hydrogen in order to control the molecular weight in a manner known per se.

The polypropylene matrix (M) produced in the slurry reactor (SR) can be if desired transferred to a first gas phase reactor to continue the preparation of the polypropylene matrix (M). The use of a two or more reactors for the preparation of the polypropylene matrix (M) is in particular useful in case the polypropylene matrix (M) shall be multimodal, like bimodal, in view of the molecular weight and/or comonomer distribution.

Typically in the gas phase reactor (GPR) of the first reactor system ($1^{st}$ RS)—if used—, the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The residence time can vary in the reactor zones identified above. In one embodiment, the residence time in the slurry reactor, for example a loop reactor, is in the range of from 0.5 to 5 hours, for example 0.5 to 2 hours, while the residence time in the gas phase reactor generally will be from 1 to 8 hours.

After the preparation of the polypropylene matrix (M) in the first reactor system ($1^{st}$ RS), said matrix is at least partially, more preferably of at least 90 wt.-%, like at least 95 wt.-%, transferred via the first conveying line (CL 1) to the second reactor system ($2^{nd}$ RS).

In case the additive (A) is externally added via an extruder as defined in detail above, then it is preferred that the total polypropylene matrix (M) of the first reactor system ($1^{st}$ RS) is transferred to the second reactor system ($2^{nd}$ RS). In case however the additive (A) is the polypropylene matrix (M) of the first reactor system ($1^{st}$ RS) as explained in detail above than only a part of the polypropylene matrix (M) of the first reactor system ($1^{st}$ RS) is transferred to the second reactor system ($2^{nd}$ RS).

In any case in the second reactor system ($2^{nd}$ RS) the elastomeric copolymer (E) is polymerized in the presence of said polypropylene matrix (M). Thereby the heterophasic polypropylene (HECO) is obtained. The second reactor system ($2^{nd}$ RS) comprises at least one gas phase reactor, preferably one or two gas phase reactor(s) (see FIGS. 4 and 6).

The reaction temperature preferably used in the gas phase reactor(s) (GPR(s)) of the second reactor system ($2^{nd}$ RS) is in the range 60 to 115° C., preferably 70 to 90° C. The reactor pressure is preferably higher than 8 bars, more preferably higher than 15 bars, and preferably in the range of 8 to 30 bar, like 15 to 30 bar, and the residence time is preferably 0.3 to 2.0 hours.

The polymerization may be achieved using any standard olefin polymerization catalyst and these are well known to the person skilled in the art. Preferred catalyst systems comprise an ordinary stereospecific Ziegler-Natta catalyst, metallocene catalysts and other organometallic or coordination catalysts. A particularly preferred catalyst system is a high yield Ziegler-Natta catalyst having a catalyst component and optionally an external donor. The catalyst system may thus contain a titanium compound and an electron-donor compound supported on an activated magnesium dichloride, a trialkylaluminium compound as activator and an electron donor compound.

A further preferred catalyst system is a metallocene catalyst having a bridged structure giving high stereoselectivity and which as an active complex is impregnated on a carrier.

Suitable catalyst systems are described in for example, EP 0 491 566, EP 0 586 390 and WO 98/12234 which are hereby incorporated by reference.

A preferred process of the one used herein is the slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

After the preparation of the heterophasic polypropylene (HECO) the same is discharged from the second reactor system ($2^{nd}$ RS) via the outlet (O) and transferred via second conveying line (CL 2) to the purge bin (PB) comprising the feeder (F).

The outlet (O) according to this invention can be preferably of continuous type or batch type.

The purge bin (PB) also known as steamer, product dryer, devolatizer, degasser, stripper or flash tank is used to remove residual monomers, easy volatile gaseous components like oligomers, and to remove and/or to deactivate other chemical components like residues of utilities like donors, alkyls etc. Preferably in such cases nitrogen and water vapor is used.

As known to the skilled person the purge bin (PB) has at the bottom end a conical form. At this end preferably the feeder (F) is located. The feeder (F) can be any feeder (F); however a rotary feeder (RF) is preferred. Via the feeder (F), i.e. the rotary feeder (RF), the heterophasic polypropylene (HECO) is transferred to the conveying system (C) which may comprise a powder silo (PS). Optionally and preferably the conveying system (C) is connected with the extruder (E) in which the heterophasic polypropylene (HECO) is pelletized. In case the conveying system (C) comprises a powder silo (PS), then the heterophasic polypropylene (HECO) is transferred from the feeder (F) to a conveying line of the conveying system (C) and from there to the powder silo (PS) and optionally to a further conveying line of the conveying system (C) which is connected with the extruder (E).

Essential aspect of the inventive process is that an additive (A) is added during the overall preparation of the heterophasic polypropylene (HECO). As stated above the produced heterophasic polypropylene (HECO) is in particular featured by a rather high content of the elastomeric copolymer (E) which leads to a high xylene cold soluble fraction (XCS) and thus to stickiness problems during the process. The stickiness problems play in particular a decisive role in the bottom of the purge bin (PB), the rotary feeder (RF) and the conveying line to the extruder or to the powder bin as well as in the powder bin itself. Due to the high stickiness of the heterophasic polypropylene (HECO), i.e. of the heterophasic polypropylene powder (HECO), the material tends to agglomerate and thus cause sheeting at least in the reactor facility after having discharged the polymer material from the second reactor system ($2^{nd}$ RS) via the outlet (O). In severe cases the heterophasic polypropylene (HECO) may also cause blocking of the system. Thus the additive (A) is used in the present process to avoid or reduce the stickiness problem of the heterophasic polypropylene (HECO) after the heterophasic polypropylene (HECO) has (α) left the outlet (O) of the second reactor system ($2^{nd}$ RS), or (β) reached the purge bin (PB), preferably reached the conical part of the purge bin (PB), or (γ) reached the feeder (F), i.e. reached the rotary feeder, preferably reached the conical part of the feeder (F), i.e. reached the conical part of the rotary feeder, of the purge bin (PB), or (δ) reached the powder silo (PS), preferably reached the conical part of the powder silo (PS), or (ε) reached a point somewhere at the second conveying line (CL 2) between the outlet (O) and the purge bin (PB), or (ζ) reached a point somewhere at the conveying system (C) between the feeder (F) and the powder silo (PS).

In an especially preferred embodiment the additive (A) is used in the present process to avoid or reduce the stickiness problem of the heterophasic polypropylene (HECO) after the heterophasic polypropylene (HECO) has (α) left the outlet (O) of the second reactor system ($2^{nd}$ RS), or (β) reached the purge bin (PB), preferably reached the conical part of the purge bin (PB), or (γ) reached the feeder (F) of the purge bin (PB), preferably reached the conical part of the feeder (F) of the purge bin (PB), or (δ) reached a point somewhere at the second conveying line (CL 2) between the outlet (O) and the purge bin (PB).

In other words the additive (A) is used in the present process to improve the flowability of the heterophasic polypropylene (HECO) after the heterophasic polypropylene (HECO) has (α) left the outlet (O) of the second reactor system ($2^{nd}$ RS), or (β) reached the purge bin (PB), preferably reached the conical part of the purge bin (PB), or (γ) reached the feeder (F), i.e. at the rotary feeder, preferably reached the conical part of the feeder (F), i.e. reached the conical part of the rotary feeder, of the purge bin (PB), or (δ) reached the powder silo (PS), preferably reached the conical part of the powder silo (PS), or (ε) reached a point somewhere at the second conveying line (CL 2) between the outlet (O) and the purge bin (PB), or (ζ) reached a point somewhere at the conveying system (C) between the feeder (F) and the powder silo (PS).

Especially the additive (A) is used in the present process to improve the flowability of the heterophasic polypropylene (HECO) after the heterophasic polypropylene (HECO) has (α) left the outlet (O) of the second reactor system ($2^{nd}$ RS), or (β) reached the purge bin (PB), preferably reached the conical part of the purge bin (PB), or (γ) reached the feeder (F) of the purge bin (PB), preferably reached the conical part of the feeder (F) of the purge bin (PB), or (δ) reached a point somewhere at the second conveying line (CL 2) between the outlet (O) and the purge bin (PB).

An improvement of flowability according to this invention is given in case the heterophasic polypropylene (HECO) provided with an additive (A) has a higher flowability compared to the same heterophasic polypropylene (HECO) but without additive (A). Even more preferred the flowability is improved by at least 10%, more preferably at least 15%, like at least 20%, wherein the improvement is calculated from formula (I)

$$\% = \{1 - [\text{flowability }[s] \text{ of }(\text{HECO}_{b1})/\text{flowability }[s] \text{ of }(\text{HECO}_{unb1})]\} \times 100 \qquad (I)$$

wherein flowability [s] of (HECO$_{b1}$) is the flowability measured in seconds of the heterophasic polypropylene (HECO) provided with an additive (A)

flowability [s] of (HECO$_{unb1}$) is the flowability measured in seconds of the same heterophasic polypropylene (HECO) as used for (HECO$_{b1}$) but without an additive (A).

The additive (A) used in the inventive process can be any additive as long it has the capability to reduce the stickiness of the sticky surface of the heterophasic polypropylene (HECO) and thus to enhance the flowability. Accordingly preferred additives (A) are those which coat at least partially, preferably substantially, the surface of the heterophasic polypropylene (HECO). Such a coating allows an unhindered transport of the heterophasic polypropylene (HECO) in the reactor facility without having substantial effect on the properties of the heterophasic polypropylene (HECO) itself. Preferred additives are any type of polymers, in particular those similar to the matrix of the heterophasic polypropylene (HECO), and additives which must be anyway added to the heterophasic polypropylene (HECO) during the compounding, i.e. extruding step. Accordingly the additive (A) is selected from the group consisting of α-olefin polymer, like polypropylene and polyethylene, for instance high density polyethylene (HDPE), linear low density polyethylene (LLDPE) or medium density polyethylene (MDPE), talc, phenolic antioxidant, stearate, like calcium stearate or magnesium stearate, silica, synthetic silica, silicate, synthetic zeolite, calcium carbonate (CaCO$_3$), magnesium oxide (MgO), magnesium hydroxide (Mg(OH)$_2$), phosphite stabilizers, UV-stabilizers, and mixtures thereof.

In case a phenolic antioxidant is used as an additive (A) than it is preferably selected from the group consisting of 2,6-di-tert.butyl-4-methyl phenol (CAS 128-37-0), pentaerythrityl-tetrakis(3-(3',5'-di-tert.butyl-4-hydroxyphenyl)-propionate (CAS 6683-19-8), octadecyl 3-(3',5'-di-tert.butyl-4-hydroxyphenyl)propionate (CAS 2082-79-3), 1,3,5-trimethyl-2,4,6-tris-(3,5-di-tert.butyl-4-hydroxyphenyl)benzene (CAS 1709-70-2), 2,2'-thiodiethylenebis-(3,5-di-tert.butyl-4-hydroxyphenyl)-propionate (CAS 41484-35-9), calcium (3,5-di-tert.butyl-4-hydroxy benzyl monoethyl-phosphonate) (CAS 65140-91-2), 1,3,5-tris(3',5'-di-tert.butyl-4'-hydroxybenzyl)-isocyanurate (CAS 27676-62-6), bis-(3,3-bis-(4'-hydroxy-3'-tert.butylphenyl)butanic acid)-glycolester (CAS 32509-66-3), 4,4'-thiobis(2-tert.butyl-5-methylphenol) (CAS 96-69-5), 2,2'-metilene-bis(6-(1-methyl-cyclohexyl)para-cresol) (CAS 77-62-3), N,N'-hexamethylene bis(3,5-di-tert.butyl-4-hydroxy-hydrocinnamamide (CAS 23128-74-7), 2,5,7,8-tetramethyl-2(4',8',12'-trimethyltridecyl)chroman-6-ol (CAS 10191-41-0), 2,2'-ethylidenebis(4,6-di-tert.butylphenol) (CAS 35958-30-6), 1,1,3-tris(2-methyl-4-hydroxy-5-tert.butylphenyl) butane (CAS 1843-03-4), 1,3,5-tris(4-tert.butyl-3-hydroxy-2,6-dimethylbenzyl)-1,3,5-triazine-2,4,6-(1H,3H,5H)-trione (CAS 40601-76-1), 3,9-bis(1,1-dimethyl-2-(beta-(3-tert.butyl-4-hydroxy-5-methylphenyl)propionyloxy)ethyl)-2,4,8,10-tetraoxaspiro(5,5)undecane (CAS 90498-90-1), 1,6-hexanediyl-bis(3,5-bis(1,1-dimethylethyl)-4-hydroxybenzene-propanoate) (CAS 35074-77-2), 2,6-di-tert.butyl-4-nonylphenol (CAS 4306-88-1), 4,4'-butylidenebis(6-tert.butyl-3-methylphenol) (CAS 85-60-9), 2,2'-methylene bis(4-methyl-6-tert.butylphenol) (CAS 119-47-1), triethyleneglycol-bis-(3-tert.butyl-4-hydroxy-5 methylphenyl)propionate (CAS 36443-68-2), benzenepropanoic acid, 3,5-bis (1,1-dimethylethyl)-4-hydroxy-,C13-15-branched and linear alkyl esters (CAS 171090-93-0), 6,6'-di-tert.butyl-2,2'-thiodi-p-cresol (CAS 90-66-4), diethyl ((3,5-bis(1,1-dimethylethyl)-4-hydroxyphenyl)methyl)phosphonate (CAS 976-56-7), 4,6-bis(octylthiomethyl)-o-cresol (CAS 110553-27-0), benzenepropanoic acid, 3,5-bis(1,1-dimethylethyl)-4-hydroxy-,C7-9-branched and linear alkyl esters (CAS 125643-61-0), 1,1,3-tris[2-methyl-4-[3-(3,5-di-t-butyl-4-hydroxyphenyl)propionyloxy]-5-t-butylphenyl]butane (CAS 180002-86-2), mixed styrenated phenols (CAS 61788-44-1), butylated, octylated phenols (68610-06-0), butylated reaction product of p-cresol and dicyclopentadiene (CAS 68610-51-5), tris(2,4-di-t-butylphenyl)phosphate (CAS 31570-04-4), tetrakis-(2,4-di-t-butylphenyl)-4,4'-biphenylen-di-phosphonite (CAS 38613-77-3), bis (2,4-di-t-butylphenyl)-pentaerythrityl-di-phosphite (CAS 26741-53-7), di-stearyl-pentaerythrityl-di-phosphite (CAS 3806-34-6), tris-nonylphenyl phosphite (CAS 26523-78-4), bis(2,6-di-t-butyl-4-methylphenyl)pentaerythrityl-di-phosphite (CAS 80693-00-1), 2,2'-methylenebis(4,6-di-t-butylphenyl)octyl-phosphite (CAS 126050-54-2), 1,1,3-tris(2-methyl-4-ditridecyl phosphite-5-t-butylphenyl)butane (CAS 68958-97-4), 4,4'-butylidenebis(3-methyl-6-t-butylphenyl-di-tridecyl)phosphate (CAS 13003-12-8), bis(2,4-dicumylphenyl)pentaerythritol diphosphite (154862-43-8), bis(2-methyl-4,6-bis(1,1-dimethylethyl)phenyl)phosphorous acid ethylester (CAS 145650-60-8), 2,2',2''-nitrilo triethyl-tris(3,3',5,5'-tetra-t-butyl-1,1'-biphenyl-2,2'-diyl)phosphite) (CAS 80410-33-9), phosphorous acid, cyclic butylethyl propandiol, 2,4,6-tri-t-butylphenyl ester (CAS 161717-32-4), 2,2'-ethylidenebis(4,6-di-t-butylphenyl)fluorophosphonite (CAS 118337-09-0), 6-3-(3-tert-Butyl-4-hydroxy-5-methylphenyl)propoxy)-2,4,8,10-tetra-tert.butyldibenz(d,t)(1.3.2) dioxaphosphepin (CAS 203255-81-6), tetrakis-(2,4-di-t-butyl-5-methyl-phenyl)-4,4'-biphenylen-di-phosphonite (CAS 147192-62-9), 1,3-bis-(diphenylphosphino)-2,2-dimethylpropane (CAS 80326-98-3), di-stearyl-thio-di-propionate (CAS 693-36-7), di-lauryl-thio-di-propionate (CAS 123-28-4), di-tridecyl-thio-di-propionate (CAS 10595-72-9), di-myristyl-thio-di-propionate (CAS 16545-54-3), di-octadecyl-disulphide (CAS 2500-88-1), Bis[2-methyl-4-(3-n-dodecylthiopropionyloxy)-5-tert-butylphenyl]sulfide (CAS 66534-05-2), pentaerythritol-tetrakis-(3-laurylthiopropionate) (CAS 29598-76-3), 3,3'-Thiobispropanoic acid dimethylester polymer with 1,4-cyclohexanedimethanol, octadecyl ester (CAS 63123-11-5), 4,4'-bis(1,1'-dimethylbenzyl)diphenylamine (CAS 10081-67-1), polymer of 2,2,4-trimethyl-1,2-dihydroquinoline (CAS 26780-96-1), p-(p-toluene-sulfonylamido)-diphenylamine (CAS 100-93-6), N,N'-diphenyl-p-phenylene-diamine (CAS 74-31-7), N,N'-dinaphtyl-p-phenylene-diamine (CAS 93-46-9), and p,p'-Dioctyldiphenylamine (CAS 101-67-7).

In case a silicate is used as an additive (A) than it is preferably selected from the group consisting aluminium silicate (CAS 1318-74-7), sodium aluminium silicate (CAS 1344-00-9), calcined kaolin (CAS 92704-41-1), and calcium silicate (CAS 1344-95-2).

In case a synthetic zeolite is used as an additive (A) than it is preferably sodium calcium aluminosilicate, hydrate (CAS 1344-01-0) or sodium calcium aluminosilicate, hydrate (CAS 1344-01-0).

In case a polymer is used as an additive (A) than it is preferably a polyethylene, like high density polyethylene (HDPE), preferably with a density of more than 945 kg/m$^3$, or polypropylene, like a random propylene copolymer, the latter is in particular preferred. Further it is appreciated that the polymer, i.e. the polyethylene or the polypropylene, has a rather low xylene cold soluble (XCS) fraction. Thus the additive (A) is preferably a polymer, i.e. the polyethylene or the polypropylene, with a xylene cold soluble fraction (XCS) of equal or below 7 wt.-%, more preferably equal or below 4 wt.-%, yet more preferably equal or below 3 wt.-%, like equal or below 2.5 wt.-%.

Preferably the additive being a polymer, i.e. the polyethylene or the polypropylene, has a melt flow rate $MFR_2$ (230° C.) in a range of 0.05 to 200.0 g/10 min, more preferably of 0.5 to 150.0 g/10 min, still more preferably of 1.0 to 100.0 g/10 min, like 1.0 to 10.0.

In a particular preferred embodiment the additive (A) is the same polypropylene as used as the polypropylene matrix (M) for the heterophasic polypropylene (HECO).

Thus it is in particular preferred that the additive (A) is selected from the group consisting of talc, phenolic antioxidant, calcium stearate, $CaCO_3$, MgO, HDPE, and polypropylene, like polypropylene matrix (M). In a specific embodiment the additive (A) is talc, calcium stearate or the polypropylene matrix (M). In a very specific embodiment the additive (A) is the polypropylene matrix (M) of the heterophasic polypropylene (HECO).

Further it is preferred that the additive (A) has a specific size. Accordingly it is appreciated that the mean particle size of equal or below 2 mm. In case the additive a polymer as defined in detail below than the mean particle size is in the range of 0.01 to 2.00 mm, more preferably in the range of 0.03 to 1.50 mm. In all other cases the mean particle size is preferably below 1.00 mm, i.e. in the range of 0.005 to 0.05 mm, like 0.09 to 0.02 mm.

The amount of the additive (A) added to the heterophasic polypropylene (HECO) which has left the outlet (O) of the second reactor system ($2^{nd}$ RS) depend very much on the used additive (A). However the amount of the additive (A) is preferably equal or below 5 wt.-%, more preferably equal or below 4 wt.-% based on the heterophasic polypropylene (HECO), i.e. the heterophasic polypropylene (HECO) discharged from the feeder (F). A preferred range of amount of additive (A) added to the heterophasic polypropylene (HECO) is 0.05 to 6.0 wt.-%, more preferred 0.1 to 5.5 wt.-%.

Further, the additive (A) must be added to the heterophasic polypropylene (HECO) at a specific point of time to the overall process to achieve the desired effect, namely an improvement of flowability. In other words the additive (A) must be fed to the heterophasic polypropylene (HECO) at the latest at the powder silo (PS), preferably however at the latest at the feeder (F) of the purge bin (PB). Accordingly the additive (A) can be fed at any place between the outlet (O) of the second reactor system ($2^{nd}$ RS) and the powder silo (PS) of the reactor facility to the heterophasic polypropylene (HECO). In an especially preferred embodiment the additive (A) can be fed at any place between the outlet (O) of the second reactor system ($2^{nd}$ RS) and the feeder (F) of the purge bin (PB) of the reactor facility to the heterophasic polypropylene (HECO).

It is however especially preferred that the additive (A) is fed to the heterophasic polypropylene (HECO) at (α) the outlet (O) of the second reactor system ($2^{nd}$ RS), or (β) the purge bin (PB), preferably at the conical part of the purge bin (PB), more preferably at the conical part of the purge bin (PB) just above the feeder (F), or (γ) the feeder (F), i.e. the rotary feeder (RF), of the purge bin (PB), preferably at the conical part of the feeder (F), i.e. at the conical part of the rotary feeder (RF), of the purge bin (PB).

Independently form the used means to fed the additive to the heterophasic polypropylene (HECO), the feeding temperature is usually in the range of −20 to +50° C. and the feeding pressure is usually in the range of 0 to 50 bar. It is in particular appreciated that the additive (A) is added under inert atmosphere, i.e. no oxygen and/or water is present. Usually nitrogen is used to establish an inert atmosphere.

The additive (A) can be fed by any suitable means to the heterophasic polypropylene (HECO). Possible solutions are for instance one or two screw feeders with appropriate feed hopper (see FIGS. 3 and 4).

In a specific aspect of the present invention the additive (A) is the polypropylene matrix (M), to be more precisely the additive (A) is the polypropylene matrix (M) produced in the first reactor system ($1^{st}$ RS). Thus part of the polypropylene matrix (M) produced in the first reactor system ($1^{st}$ RS) is sidelined and not fed into the second reactor system ($2^{nd}$ RS) but fed to the heterophasic polypropylene (HECO) discharged from the second reactor system ($2^{nd}$ RS). Accordingly term "sidelined polypropylene matrix (M)" or similar terms used in the present invention indicate that this polypropylene matrix (M) is not fed to the second reactor system ($2^{nd}$ RS) but fed to the produced heterophasic polypropylene (HECO) after having left the second reactor system ($2^{nd}$ RS).

More specifically, the sidelined polypropylene matrix (M) is fed to the heterophasic polypropylene (HECO)

(α) at the outlet (O) of the second reactor system ($2^{nd}$ RS), or (β) at the purge bin (PB), preferably at the conical part of the purge bin (PB), more preferably at the conical part of the purge bin (PB) just above the feeder (F), or (γ) at the feeder (F), i.e. the rotary feeder (RF), of the purge bin (PB), preferably at the conical part of the feeder (F), i.e. at the conical part of the rotary feeder (RF), of the purge bin (PB), or (δ) at the powder silo (PS), preferably at the conical part of the powder silo (PS), or (ε) at the second conveying line (CL 2) between the outlet (O) and the purge bin (PB), or (ζ) at the conveying system (C) between the feeder (F) and the powder silo (PS).

Even more specifically, the sidelined polypropylene matrix (M) is fed to the heterophasic polypropylene (HECO)

Figure 5:
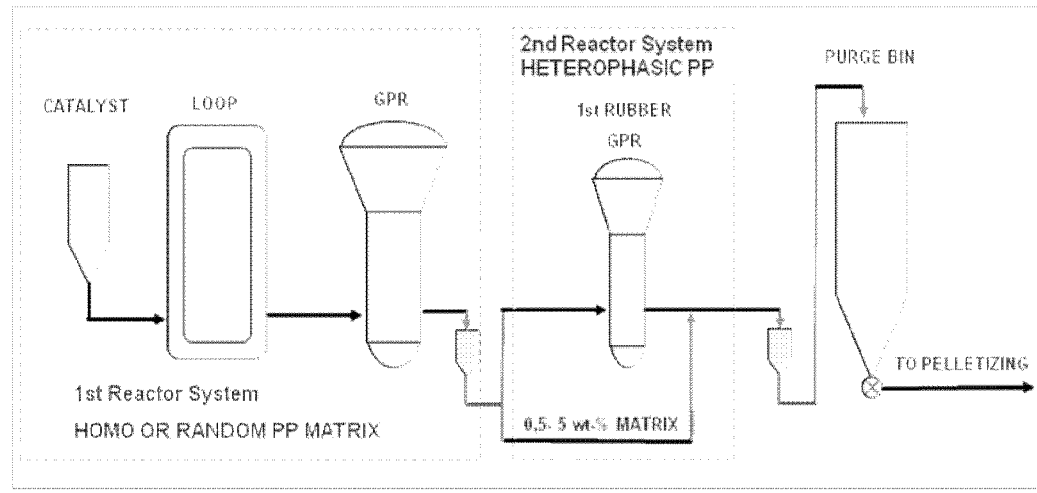
FIG. 5 is a schematic illustrating a first reactor system, second reactor system, purge bin, and conveying system arrangement for the preparation of a heterophasic polypropylene.
Figure 6:
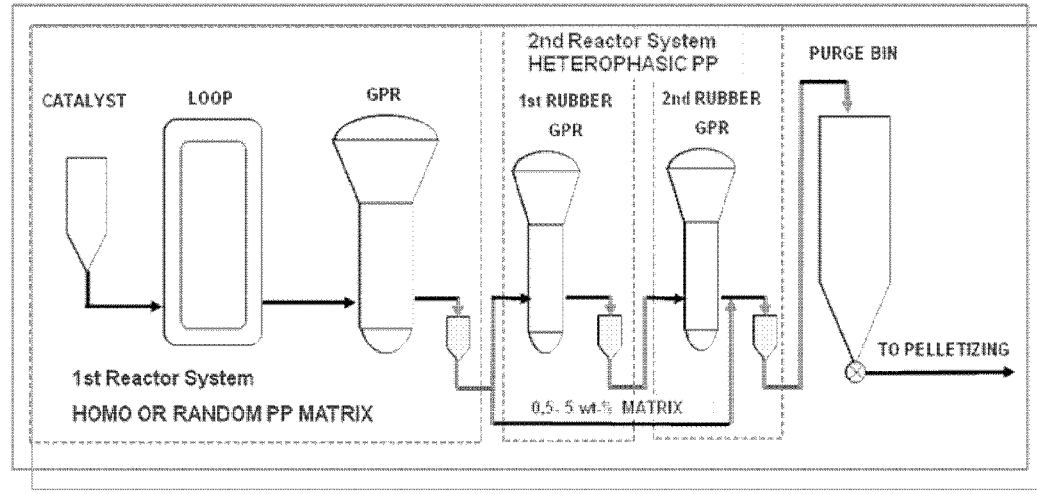
FIG. 6 is a schematic illustrating a first reactor system, second reactor system, purge bin, and conveying system arrangement for the preparation of a heterophasic polypropylene.

(α) at the outlet (O) of the second reactor system ($2^{nd}$ RS), or (β) at the purge bin (PB), preferably at the conical part of the purge bin (PB), more preferably at the conical part of the purge bin (PB) just above the feeder (F), or (γ) at the feeder (F), i.e. the rotary feeder (RF), of the purge bin (PB), preferably at the conical part of the feeder (F), i.e. at the conical part of the rotary feeder (RF), of the purge bin (PB), or (δ) at the second conveying line (CL 2) between the outlet (O) and the purge bin (PB) (see FIGS. 5 and 6).

In other words a side stream (SS) of the polypropylene matrix (M) produced in the first reactor system ($1^{st}$ RS) is used as the additive (A). Said side stream (SS) is preferably fed (α) to the outlet (O) of the second reactor system ($2^{nd}$ RS), or (β) to the purge bin (PB), preferably to the conical part of the purge bin (PB), more preferably to the conical part of the purge bin (PB) just above the feeder (F), or (γ) to the feeder (F), i.e. to the rotary feeder (RF), of the purge bin (PB), preferably to the conical part of the feeder (F), i.e. to the conical part of the rotary feeder (RF), of the purge bin (PB), or (δ) to the powder silo (PS), preferably to the conical part of the powder silo (PS), or (ε) to the second conveying line (CL 2) between the outlet (O) and the purge bin (PB), or (ζ) to the conveying system (C) between the feeder (F) and the powder silo (PS).

In particular preferred that the side stream (SS) of the polypropylene matrix (M) produced in the first reactor system ($1^{st}$ RS) is fed
(α) to the outlet (O) of the second reactor system ($2^{nd}$ RS), or
(β) to the purge bin (PB), preferably to the conical part of the purge bin (PB), more preferably to the conical part of the purge bin (PB) just above the feeder (F), or
(γ) to the feeder (F), i.e. to the rotary feeder (RF), of the purge bin (PB), preferably to the conical part of the feeder (F), i.e. to the conical part of the rotary feeder (RF), of the purge bin (PB), or
(δ) to the second conveying line (CL 2) between the outlet (O) and the purge bin (PB), (see FIGS. 5 and 6).

It is especially preferred that the side stream (SS) of the polypropylene matrix (M) produced in the first reactor system ($1^{st}$ RS) is fed to
(α) the outlet (O) of the second reactor system ($2^{nd}$ RS), or
(β) the feeder (F), i.e. to the rotary feeder (RF), of the purge bin (PB), preferably to the conical part of the feeder (F), i.e. to the conical part of the rotary feeder (RF), of the purge bin (PB).

The amount of the polypropylene matrix (M) produced in the first reactor system ($1^{st}$ RS) usually sidelined is up to 10 wt.-%, more preferably equal or less than 5 wt.-%. A preferred range is 0.5 to 10.0 wt.-%, more preferred 1.0 to 7.0 wt.-%, yet more preferred 1.5 to 5.0 wt.-%, like 3.0 to 5.0 wt.-%.

Accordingly the amount of polypropylene matrix (M) produced in the first reactor system ($1^{st}$ RS) usually transferred to the second reactor system ($2^{nd}$ RS) is the main part, i.e. at least 90 wt.-%, at least 95 wt.-%. A preferred range of polypropylene matrix (M) transferred to the second reactor system ($2^{nd}$ RS) is 90.0 to 99.5 wt.-%, more preferred 93.0 to 99.0 wt.-%, yet more preferred 95.0 to 98.5 wt.-%, like 95.0 to 97.0 wt.-%.

Taking the specific process in mind, the present invention discloses also a reactor facility which comprises in series
(i) a first reactor system ($1^{st}$ RS) comprising at least a slurry reactor (SR) and/or a gas phase reactor (GPR),
(ii) a first conveying line (CL 1) connecting the first reactor system ($1^{st}$ RS) with a second reactor system ($2^{nd}$ RS),
(iii) the second reactor system ($2^{nd}$ RS) comprising at least one gas phase reactor (GPR) and an outlet (O),
(iv) a second conveying line (CL 2) connecting the outlet (O) of the second reactor system ($2^{nd}$ RS) with a purge bin (PB),
(v) the purge bin (PB) comprising a feeder (F),
(vi) a conveying system (C) optionally comprising a powder silo (PS),
(vii) the conveying system (C) being connected with the feeder (F) of the purge bin (PB), and
(vii) optionally an extruder (E) connected with the conveying system (C),
wherein the reactor facility comprises additionally a side stream line (SSL) which
(a) preferably enables the transport of the polypropylene matrix (M) produced in the first reactor system ($1^{st}$ RS) and
(b) connects the first reactor system ($1^{st}$ RS) with
 (α) the outlet (O) of the second reactor system ($2^{nd}$ RS), or
 (β) the purge bin (PB), preferably the conical part of the purge bin (PB), or
 (γ) the feeder (F), i.e. at the rotary feeder, preferably the conical part of the feeder (F), i.e. the conical part of the rotary feeder, of the purge bin (PB), or
 (δ) the powder silo (PS), preferably the conical part of the powder silo (PS), or
 (ε) the second conveying line (CL 2) between the outlet (O) and the purge bin (PB), or
 (ζ) the conveying system (C) between the feeder (F) and the powder silo (PS).

The present invention discloses in particular a reactor facility which comprises in series
(i) a first reactor system ($1^{st}$ RS) comprising at least a slurry reactor (SR) and/or a gas phase reactor (GPR),
(ii) a first conveying line (CL 1) connecting the first reactor system ($1^{st}$ RS) with a second reactor system ($2^{nd}$ RS),
(iii) the second reactor system ($2^{nd}$ RS) comprising at least one gas phase reactor (GPR) and an outlet (O),
(iv) a second conveying line (CL 2) connecting the outlet (O) of the second reactor system ($2^{nd}$ RS) with a purge bin (PB),
(v) the purge bin (PB) comprising a feeder (F),
(vi) a conveying system (C) optionally comprising a powder silo (PS),
(vii) the conveying system (C) being connected with the feeder (F) of the purge bin (PB), and
(vii) optionally an extruder (E) connected with the conveying system (C),
wherein the reactor facility comprises additionally a side stream line (SSL) which
(a) preferably enables the transport of the polypropylene matrix (M) produced in the first reactor system ($1^{st}$ RS) and
(b) connects the first reactor system ($1^{st}$ RS) with
 (α) the outlet (O) of the second reactor system ($2^{nd}$ RS), or
 (β) the purge bin (PB), preferably the conical part of the purge bin (PB), more preferably the conical part of the purge bin (PB) just above the feeder (F), or
 (γ) the feeder (F), i.e. the rotary feeder (RF), of the purge bin (PB), preferably the conical part of the feeder (F), i.e. the conical part of the rotary feeder (RF), of the purge bin (PB), or
 (δ) the second conveying line (CL 2) between the outlet (O) and the purge bin (PB), (see FIGS. 5 and 6).

Preferably the side stream line (SSL) is connected with the outlet (O) of the second reactor system ($2^{nd}$ RS) and/or the conical part of the feeder (F).

The specific embodiments for the individual parts of the reactor facility are the same as discussed above. Accordingly the first reactor system ($1^{st}$ RS) may comprise, preferably consist of, a slurry reactor, i.e. loop reactor, and/or a gas phase reactor. On the other hand the second reactor system ($2^{nd}$ RS) may comprise one or two gas phase reactors. Therefore in case the first reactor system ($1^{st}$ RS) comprises a slurry reactor (SR) and a gas phase reactor than part of the polypropylene matrix (M) is preferably sidelined from the gas phase reactor. On the other hand in case the first reactor system ($1^{st}$ RS) comprises only a slurry reactor (SR) as polymerization unit than part of the polypropylene matrix (M) is sidelined from said slurry reactor (SR).

To enable in a sufficient manner the transport of the polypropylene matrix (M) via the side stream line (SSL) a high pressure flash after the first reactor system ($1^{st}$ RS) with an XCV valves as well as a high pressure flash with a separate feed hopper and rotary feeder can be used.

Thus in a very specific embodiment, the inventive method is defined as a method for the preparation of a heterophasic polypropylene (HECO) in a reactor facility, wherein
(A) the reactor facility comprises in series
 (i) a first reactor system ($1^{st}$ RS) comprising at least a slurry reactor (SR) and/or at least one gas phase reactor (GPR),
 (ii) a first conveying line (CL 1) connecting the first reactor system ($1^{st}$ RS) with a second reactor system ($2^{nd}$ RS),
 (iii) the second reactor system ($2^{nd}$ RS) comprising at least one gas phase reactor (GPR) and an outlet (O), (iv) a second conveying line (CL 2) connecting the outlet (O) of the second reactor system (2$^{nd}$ RS) with a purge bin (PB) comprising a feeder (F),
(v) a conveying system (C) optionally comprising a powder silo (PS),
(vi) the conveying system (C) being connected with the feeder (F) of the purge bin (PB), and
(vii) optionally an extruder (E) connected with the conveying system (C), and additionally the reactor facility comprises a side stream line (SSL) which connects the first reactor system (1$^{st}$ RS), i.e. either the slurry reactor (SR) of the first reactor system (1$^{st}$ RS) (if the first reactor system (1$^{st}$ RS) does not comprise a gas phase reactor (GPR), i.e. comprises only of slurry reactor (SR) as reactor unit) or the gas phase reactor (GPR) of the first reactor system (1$^{st}$ RS) (if the first reactor system (1$^{st}$ RS) comprises a slurry reactor (SR) and a gas phase reactor (GPR)), with
  (α) the outlet (O) of the second reactor system (2$^{nd}$ RS), or
  (β) the purge bin (PB), preferably the conical part of the purge bin (PB), or
  (γ) the feeder (F), i.e. the rotary feeder, preferably the conical part of the feeder (F), i.e. the conical part of the rotary feeder, of the purge bin (PB), or
  (δ) the powder silo (PS), preferably the conical part of the powder silo (PS), or
  (ε) at the second conveying line (CL 2) between the outlet (O) and the purge bin (PB), or
  (ζ) the conveying system (C) between the feeder (F) and the powder silo (PS),
(B) the preparation of said heterophasic polypropylene (HECO) comprises the steps in the order of
  (a) producing in said first reactor system (1$^{st}$ RS) the polypropylene matrix (M),
  (b) transferring one part of said polypropylene matrix (M), preferably 80.0 to 99.5 wt.-% of said polypropylene matrix (M), more preferably 93.0 to 99.0 wt.-% of said polypropylene matrix (M), yet more preferably 95.0 to 98.5 wt.-% of said polypropylene matrix (M), to said second reactor system (2$^{nd}$ RS) via the first conveying line (CL 1),
  (c) producing in said second reactor system (2$^{nd}$ RS) in the presence of said polypropylene matrix (M) the elastomeric copolymer (E) obtaining the heterophasic polypropylene (HECO),
  (d) discharging said heterophasic polypropylene (HECO) from said second reactor system (2$^{nd}$ RS) via the outlet (O),
  (e) transferring said discharged heterophasic polypropylene (HECO) via the second conveying line (CL 2) to said purge bin (PB) comprising said feeder (F), and
  (f) transferring further said discharged heterophasic polypropylene (HECO) from said purge bin (PB) via said feeder (F) to said conveying system (C), optionally to the powder silo (PS) of the conveying system (C),
  (g) optionally extruding the heterophasic polypropylene (HECO) in the extruder (E) to pellets,
(C) the produced heterophasic polypropylene (HECO) is provided with an additive (A) being the remaining part of the polypropylene matrix (M) which has been not transferred to the second reactor system (2$^{nd}$ RS) but has been sidelined via the side stream line (SSL), said additive (A), i.e. the sidelined polypropylene matrix (M), is fed to the produced heterophasic polypropylene (HECO)
  (α) at the outlet (O) of the second reactor system (2$^{nd}$ RS), or
  (β) at the purge bin (PB), preferably at the conical part of the purge bin (PB), or
  (γ) at the feeder (F), i.e. at the rotary feeder, preferably at the conical part of the feeder (F), i.e. at the conical part of the rotary feeder, of the purge bin (PB), or
  (δ) at the powder silo (PS), preferably at the conical part of the powder silo (PS), or
  (ε) at the second conveying line (CL 2) between the outlet (O) and the purge bin (PB), or
  (ζ) at the conveying system (C) between the feeder (F) and the powder silo (PS), and
(D) the produced heterophasic polypropylene (HECO) after being treated with the additive (A), i.e. after having left the powder silo (PS) and/or the purge bin (PB),
  (i) has a xylene cold soluble fraction (XCS) of at least 15 wt.-%, preferably of at least 20 wt.-%, more preferably of at least 25 wt.-%, yet more preferably of at least 30 wt.-%, like of at least 35 wt.-%, and
  (ii) comprises a polypropylene matrix (M) and dispersed therein an elastomeric copolymer (E).

Thus in a very preferred embodiment, the inventive method is defined as a method for the preparation of a heterophasic polypropylene (HECO) in a reactor facility, wherein
(A) the reactor facility comprises in series
  (i) a first reactor system (1$^{st}$ RS) comprising at least a slurry reactor (SR) and/or at least one gas phase reactor (GPR),
  (ii) a first conveying line (CL 1) connecting the first reactor system (1$^{st}$ RS) with a second reactor system (2$^{nd}$ RS),
  (iii) the second reactor system (2$^{nd}$ RS) comprising at least one gas phase reactor (GPR) and an outlet (O),
  (iv) a second conveying line (CL 2) connecting the outlet (O) of the second reactor system (2$^{nd}$ RS) with a purge bin (PB) comprising a feeder (F),
  (v) a conveying system (C) optionally comprising a powder silo (PS),
  (vi) the conveying system (C) being connected with the feeder (F) of the purge bin (PB), and
  (vii) optionally an extruder (E) connected with the conveying system (C), and additionally a side stream line (SSL) which connects the first reactor system (1$^{st}$ RS), i.e. either the slurry reactor (SR) of the first reactor system (1$^{st}$ RS) (if the first reactor system (1$^{st}$ RS) does not comprise a gas phase reactor (GPR), i.e. comprises only of slurry reactor (SR) as reactor unit) or the gas phase reactor (GPR) of the first reactor system (1$^{st}$ RS) (if the first reactor system (1$^{st}$ RS) comprises a slurry reactor (SR) and a gas phase reactor (GPR)), with
    (α) the outlet (O) of the second reactor system (2$^{nd}$ RS), or
    (β) the purge bin (PB), preferably the conical part of the purge bin (PB), more preferably the conical part of the purge bin (PB) just above the feeder (F), or
    (γ) the feeder (F), i.e. the rotary feeder (RF), of the purge bin (PB), preferably the conical part of the feeder (F), i.e. the conical part of the rotary feeder (RF), of the purge bin (PB), or
    (δ) the second conveying line (CL 2) between the outlet (O) and the purge bin (PB),
(B) the preparation of said heterophasic polypropylene (HECO) comprises the steps in the order of
  (a) producing in said first reactor system (1$^{st}$ RS) the polypropylene matrix (M),
  (b) transferring one part of said polypropylene matrix (M), preferably 80.0 to 99.5 wt.-% of said polypropylene matrix (M), more preferably 93.0 to 99.0 wt.-% of said polypropylene matrix (M), yet more preferably 95.0 to 98.5 wt.-% of said polypropylene matrix (M), to said second reactor system ($2^{nd}$ RS) via the first conveying line (CL 1), (c) producing in said second reactor system ($2^{nd}$ RS) in the presence of said polypropylene matrix (M) the elastomeric copolymer (E) obtaining the heterophasic polypropylene (HECO), (d) discharging said heterophasic polypropylene (HECO) from said second reactor system ($2^{nd}$ RS) via the outlet (O), (e) transferring said discharged heterophasic polypropylene (HECO) via the second conveying line (CL 2) to said purge bin (PB) comprising said feeder (F), and (f) transferring further said discharged heterophasic polypropylene (HECO) from said purge bin (PB) via said feeder (F) to said conveying system (C), optionally to the powder silo (PS) of the conveying system (C), (g) optionally extruding the heterophasic polypropylene (HECO) in the extruder (E) to pellets, (C) the produced heterophasic polypropylene (HECO) is provided with an additive (A) being the remaining part of the polypropylene matrix (M) which has been not transferred to the second reactor system ($2^{nd}$ RS) but has been sidelined via the side stream line (SSL), said additive (A), i.e. the sidelined polypropylene matrix (M), is fed to the produced heterophasic polypropylene (HECO)

(α) at the outlet (O) of the second reactor system ($2^{nd}$ RS), or (β) at the purge bin (PB), preferably at the conical part of the purge bin (PB), more preferably at the conical part of the purge bin (PB) just above the feeder (F), or (γ) at the feeder (F), i.e. at the rotary feeder (RF), of the purge bin (PB), preferably at the conical part of the feeder (F), i.e. at the conical part of the rotary feeder (RF), of the purge bin (PB), or (δ) at the second conveying line (CL 2) between the outlet (O) and the purge bin (PB), and (D) the produced heterophasic polypropylene (HECO) after having left the purge bin (PB) via the feeder (F)

(i) has a xylene cold soluble fraction (XCS) of at least 15 wt.-%, preferably of at least 20 wt.-%, more preferably of at least 25 wt.-%, yet more preferably of at least 30 wt.-%, like of at least 35 wt.-%, and (ii) comprises a polypropylene matrix (M) and dispersed therein an elastomeric copolymer (E).

Concerning the individual polymer components produced, i.e. the polypropylene matrix (M), the elastomeric copolymer (E) and the heterophasic polypropylene (HECO), and the specific preferred embodiments thereof it is referred to the definitions given above.

The present invention will now be described in further detail by the examples provided below.

EXAMPLES

1. Definitions/Measuring Methods

The following definitions of terms and determination methods apply for the above general description of the invention as well as to the below examples unless otherwise defined. Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014). Intrinsic viscosity (IV) is determined according to ISO 1628-1 at 135° C. with decaline as solvent.

Randomness

In the FTIR measurements, films of 250-mm thickness were compression moulded at 225° C. and investigated on a Perkin-Elmer System 2000 FTIR instrument. The ethylene peak area (760-700 $cm^{-1}$) was used as a measure of total ethylene content. The absorption band for the structure —P-E-P— (one ethylene unit between propylene units), occurs at 733 $cm^{-1}$. This band characterizes the random ethylene content. For longer ethylene sequences (more than two units), an absorption band occurs at 720 $cm^{-1}$. Generally, a shoulder corresponding to longer ethylene runs is observed for the random copolymers. The calibration for total ethylene content based on the area and random ethylene (PEP) content based on peak height at 733 $cm^{-1}$ was made by $^{13}$C-NMR. (Thermochimica Acta, 66 (1990) 53-68).

Randomness=random ethylene (—P-E-P—) content/ the total ethylene content×100%.

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-$d_6$ (90/10 w/w). For the pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad concentration in a manner well known in the art.

$MFR_2$ is measured according to ISO 1133 (230° C., 2.16 kg load).

Comonomer content of C2 is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —$CH_2$— absorption peak (800-650 $cm^{-1}$) was measured with Perkin Elmer FTIR 1600 spectrometer. The method was calibrated by ethylene content data measured by $^{13}$C-NMR.

The xylene cold solubles (XCS, wt.-%): Content of xylene cold solubles (XCS) is determined at 23° C. according ISO 6427.

Figure 7:
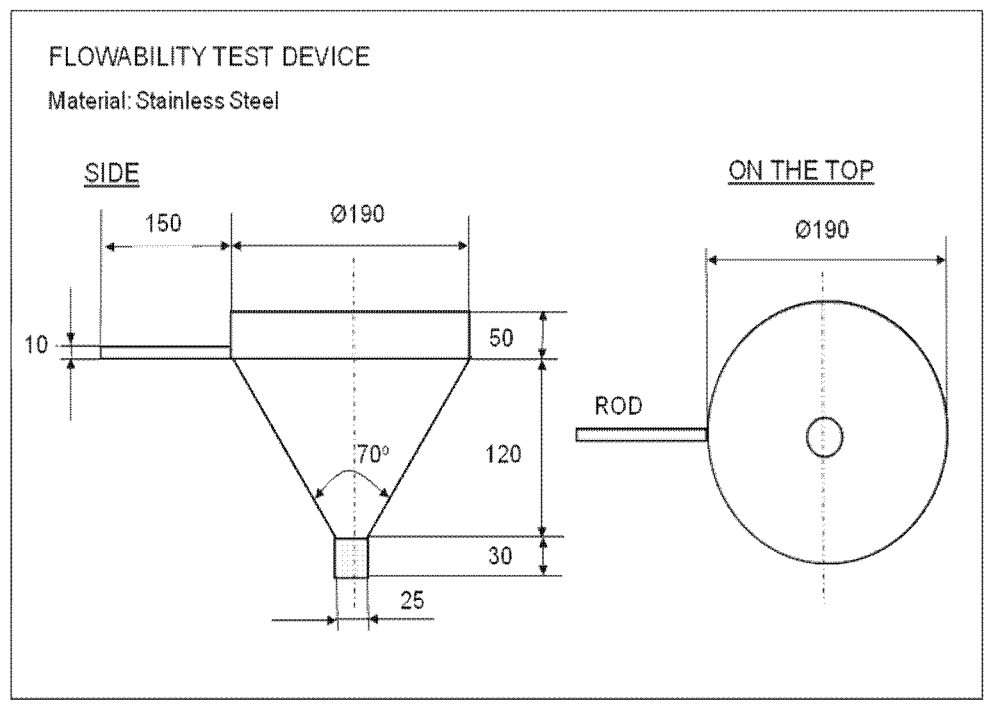
FIG. 7 is a schematic illustrating a side elevation view and a top plan view of a flowability test device having a funnel.

Mean particle size is measured with Coulter Counter LS200 at room temperature with n-heptane as medium; particle sizes below 100 nm by transmission electron microscopy Flowability 300±0.5 g polymer powder sample was weighed in a decanter. The polymer powder was poured to the other decanter having the same size. This was repeated altogether 5 times. After that the flowability was measured by letting this sample flow through a funnel at room temperature. The time it takes for a sample to flow through is a measurement of stickiness. The average of 3 separate determinations was defined as flowability as a unit second. The dimensions of the funnel can be deducted from FIG. 7

2. Preparation of the Examples and Properties

Example 1

Comparative

The matrix part of the heterophasic polypropylene was produced in the Loop—$1^{st}$ Gas Phase Reactor (GPR) combination. The rubber part of polymer was produced in $2^{nd}$ GPR and $3^{rd}$ GPR. From product point of view the most important was to reach good stiffness impact balance. Requirements for the final product were as follows: $MFR_2$=18-25 g/10 min;

XCS=30-35 wt.-%; $C_2$=16-20 wt.-%. IV of AM 1.7-1.9 dl/g; Flexural Modulus=1000 MPa; Charpy RT (−20)° C.=12 kg/m².

Catalyst

A highly active propylene polymerization catalyst of ZN type, prepared according to Finnish Patent No. 88047 was used. The catalyst concentration in oil-grease mixture was 12 g/dm³.

Polymerization of the Matrix Part

Said mixture of catalyst and viscous medium was fed continuously by pump into the polymerization process. The catalyst was contacted with triethylaluminium (TEAL) and dicyclopentyldimethoxysilane (donor D) in pipeline. TEAL feed was about 200 g/$t_{propylene}$ and Donor feed was about 20 g/$t_{propylene}$.

The catalyst was flushed with propylene to the continuous prepolymerization reactor in which also TEA and D-donor were fed. Prepolymerization reactor was operated at the temperature of 30° C. and pressure of 56 barg. The residence time in the prepolymerization reactor was 20 minutes. Hydrogen feed to the prepolymerization reactor was 0.15 mol-%. The prepolymerized catalyst component was used in a loop reactor and a gas phase reactors connected in series.

The operating temperature in loop reactor was 80° C. and the pressure was 55 barg. The residence time in the loop reactor was about 0.45 h. The polypropylene measured after loop had $MFR_2$ (230° C.) of 103-105 g/10 min and XCS was 1.8-2 wt.-%.

Loop product was transferred to the 1$^{st}$ GPR via direct feed line between Loop and 1$^{st}$ GPR. The 1$^{st}$ GPR was operated at 85° C. and the total pressure was 22 barg. The residence time of the polymer was controlled so that the production split between loop and gas phase reactor was about 60/40%. Hydrogen was fed enough to keep $MFR_2$ (230° C.) after 1$^{st}$ GPR 55-61 g/10 min. XCS after reactor was 1.5-1.6 wt.-%.

Polymerization of the Rubber Part

The polypropylene powder was transferred to the 2$^{nd}$ GPR through Flash Tank.

The polymerisation temperature in the 2$^{nd}$ GPR was 80° C. and the total pressure was 29-30 barg. The comonomer gas ratio ($C_2/C_3$) was kept as constant in range 750-800 mol/kmol. Enough ethylene was fed to control the measured C2/AM after reactor to 45 wt.-%. Enough hydrogen was fed to fix IV/AM to 2.0 dl/g. Polymer XCS after reactor was adjusted by changing the residence time i.e. bed level to 21 wt.-%.

The polypropylene powder was conveyed via Flash Tank to the 3$^{rd}$ GPR where the temperature was 85° C. and the total pressure was 30 barg. Ethylene was fed to fix the final measured C2/AM to 47 wt.-%. Hydrogen was fed to fix IV/AM to 1.7-1.9 dl/g. Final XCS was adjusted by changing the residence time i.e. bed level to 29 wt-%. Final MFR was 25 g/10 min.

Polypropylene powder was conveyed to the Purge Bin vessel where unreacted monomers and possible oligomers were removed. The residence time in the Purge Bin was 1 h and the temperature was about 80° C. The polymer powder was purged with nitrogen flow 5 kg/h. Stickiness of the polymer powder was observed and there were problems in conveying the product from Purge Bin to Powder Silos. Flowability of the polymer powder was measured after Purge Bin and it was 12.3 s.

Example 2

The procedure was the same as in Comparative Example 1 but 1.0 wt.-% matrix polypropylene powder after 1$^{st}$ GPR was added to the material stream before Purge Bin (1 meter above the top of the Purge Bin). Polymer Powder was not sticky anymore and there were no product transfer problems between Purge Bin and Powder Silos. Flowability of the polymer powder was measured after Purge Bin and it was 11.5 s.

Example 3

The procedure was the same as in Comparative Example 1 but 2.0 wt-% matrix polypropylene powder after 1$^{st}$ GPR was added to the material stream before Purge Bin (1 meter above the top of the Purge Bin). Polymer Powder was not sticky and there were no product transfer problems between Purge Bin and Powder Silos. Flowability of the polymer powder was measured after Purge Bin and it was 11.0 s.

Example 4

Comparative

The procedure was the same as in Comparative Example 1 but the XCS of the final polymer was higher i.e. 35 wt.-%. Respectively the $MFR_2$ (230° C.) of the final polymer was lower i.e. 19 g/10 min. High stickiness of the polymer powder was observed and there were problems in conveying the product from Purge Bin to Powder Silos. Flowability of the polymer powder was measured after Purge Bin and it was 14 s.

Example 5

The procedure was the same as in Comparative Example 4 but 0.3 wt-% TALC TITAL 10 manufactured by Incemin was added to the polymer powder before Purge Bin (1 meter above the top of the Purge Bin). Flowability of the polymer powder was really good. Flowability of the polymer powder was measured and it was 8.3 s.

Example 6

The procedure was the same as in Comparative Example 4 but 0.5 wt-% TALC TITAL 10 manufactured by Incemin was added to the polymer powder before Purge Bin (1 meter above the top of the Purge Bin). Further improvement of the flowability was observed. Flowability of the polymer powder was measured and it was 6.6 s.

All results are shown in attached tables 1 to 3.

TABLE 1

|  | Ex 1 (Co) | Ex 2 | Ex 3 | Ex 4 (Co) | Ex 5 | Ex 6 |
| --- | --- | --- | --- | --- | --- | --- |
| Catalyst | ZNPP | ZNPP | ZNPP | ZNPP | ZNPP | ZNPP |
| Donor type | D | D | D | D | D | D |
| Catalyst feed (g/h) | 1.72 | 1.72 | 1.72 | 1.33 | 1.33 | 1.33 |
| Catalyst Ti content (wt-%) | 1.8 | 1.8 | 1.8 | 1.8 | 1.8 | 1.8 |

TABLE 1-continued

|  | Ex 1 (Co) | Ex 2 | Ex 3 | Ex 4 (Co) | Ex 5 | Ex 6 |
|---|---|---|---|---|---|---|
| Cocatalyst feed (g/t propylene) | 200.7 | 200.7 | 200.7 | 201.5 | 201.5 | 201.5 |
| Donor feed (g/t propylene) | 20.3 | 20.3 | 20.3 | 21.8 | 21.8 | 21.8 |
| Al/Ti ratio (mol/mol) | 514 | 514 | 514 | 652 | 652 | 652 |
| Al/donor ratio (mol/mol) | 19.8 | 19.8 | 19.8 | 18.5 | 18.5 | 18.5 |
| Prepolymerization | | | | | | |
| Temperature (° C.) | 30 | 30 | 30 | 30 | 30 | 30 |
| Pressure (kPa) | 5600 | 5600 | 5600 | 5500 | 5500 | 5500 |
| Hydrogen feed (g/h) | 0.82 | 0.82 | 0.82 | 0.85 | 0.85 | 0.85 |
| Residence time (h) | 0.32 | 0.32 | 0.32 | 0.39 | 0.39 | 0.39 |
| Loop Reactor | | | | | | |
| Temperature (° C.) | 80 | 80 | 80 | 81.7 | 81.7 | 81.7 |
| Pressure (kPa) | 5452 | 5452 | 5452 | 5464 | 5464 | 5464 |
| Hydrogen feed (g/h) | 163.22 | 163.22 | 163.22 | 154.2 | 154.2 | 154.2 |
| H2/C3 ratio (mol/kmol) | 18.00 | 18.00 | 18.00 | 18.00 | 18.00 | 18.00 |
| Residence time (h) | 0.48 | 0.48 | 0.48 | 0.45 | 0.45 | 0.45 |
| Production rate (kg/h) | 31.9 | 31.9 | 31.9 | 31.2 | 31.2 | 31.2 |
| Catalyst productivity (kg/g) | 18.6 | 18.6 | 18.6 | 23.84 | 23.84 | 23.84 |
| Solid concentration (%) | 23.2 | 23.2 | 23.2 | 21.9 | 21.9 | 21.9 |
| Slurry density (kg/m3) | 439 | 439 | 439 | 431 | 431 | 431 |
| Split (%) | 60 | 60 | 60 | 60 | 60 | 60 |
| MFR2 (g/10 min) | 102.8 | 102.8 | 102.8 | 105.5 | 105.5 | 105.5 |
| XCS (wt-%) | 1.8 | 1.8 | 1.8 | 2 | 2 | 2 |
| Bulk density (kg/m3) | 393 | 393 | 393 | 401 | 401 | 401 |
| Average particle size (mm) | 1.4 | 1.4 | 1.4 | 1.5 | 1.5 | 1.5 |

TABLE 2

|  | Ex 1 (Co) | Ex 2 | Ex 3 | Ex 4 (Co) | Ex 5 | Ex 6 |
|---|---|---|---|---|---|---|
| 1$^{st}$ Gas Phase Reactor | | | | | | |
| Temperature (° C.) | 85 | 85 | 85 | 85 | 85 | 85 |
| Pressure (kPa) | 2200 | 2200 | 2200 | 2200 | 2200 | 2200 |
| Propylene feed (kg/h) | 50.31 | 50.31 | 50.31 | 44.33 | 44.33 | 44.33 |
| Propylene concentration (mol-%) | 65.9 | 65.9 | 65.9 | 65.4 | 65.4 | 65.4 |
| H2/C3 ratio (mol/kmol) | 56.6 | 56.6 | 56.6 | 58.5 | 58.5 | 58.5 |
| Bed level (cm) | 60 | 60 | 60 | 60 | 60 | 60 |
| Residence time (h) | 1.7 | 1.7 | 1.7 | 1.8 | 1.8 | 1.8 |
| Production rate (kg/h) | 21 | 21 | 21 | 20 | 20 | 20 |
| Production Split % | 40 | 40 | 40 | 40 | 40 | 40 |
| MFR2 (g/10 min) | 60.82 | 60.82 | 60.82 | 55.37 | 55.37 | 55.37 |
| XCS (wt-%) | 1.6 | 1.6 | 1.6 | 1.5 | 1.5 | 1.5 |
| Bulk density (kg/m3) | 412 | 412 | 412 | 430 | 430 | 430 |
| Average particle size (mm) | 1.66 | 1.66 | 1.66 | 1.6 | 1.6 | 1.6 |
| 2$^{nd}$ Gas Phase Reactor | | | | | | |
| Temperature (° C.) | 80.1 | 80.1 | 80.1 | 79.9 | 79.9 | 79.9 |
| Pressure (kPa) | 3000 | 3000 | 3000 | 2904 | 2904 | 2904 |
| Propylene partial pressure (kPa) | 855 | 855 | 855 | 826 | 826 | 826 |
| Propylene feed (kg/h) | 79.9 | 79.9 | 79.9 | 77.5 | 77.5 | 77.5 |
| Ethylene feed (kg/h) | 46.89 | 46.89 | 46.89 | 44.56 | 44.56 | 44.56 |
| Propylene concentration (mol-%) | 26.87 | 26.87 | 26.87 | 26.73 | 26.73 | 26.73 |
| H2/C3 ratio (mol/kmol) | 187 | 187 | 187 | 185 | 185 | 185 |
| H2/C2 ratio (mol/kmol) | 236.22 | 236.22 | 236.22 | 243.33 | 243.33 | 243.33 |
| Ethylene concentration (mol-%) | 21.87 | 21.87 | 21.87 | 20.95 | 20.95 | 20.95 |
| C2/C3 ratio (mol/kmol) | 792.74 | 792.74 | 792.74 | 762.19 | 762.19 | 762.19 |
| Bed level (cm) | 139.11 | 139.11 | 139.11 | 120.6 | 120.6 | 120.6 |
| Residence time (h) | 2.45 | 2.45 | 2.45 | 2.28 | 2.28 | 2.28 |
| Production rate (kg/h) | 16.42 | 16.42 | 16.42 | 14.79 | 14.79 | 14.79 |
| MFR2 (g/10 min) | 31.95 | 31.95 | 31.95 | 25.63 | 25.63 | 25.63 |
| XCS (%) | 21.3 | 21.3 | 21.3 | 21.9 | 21.9 | 21.9 |
| AM (%) | 19.36 | 19.36 | 19.36 | 20.9 | 20.9 | 20.9 |
| Ethene of AM (%) | 45.69 | 45.69 | 45.69 | 43.21 | 43.21 | 43.21 |
| Viscosity of AM (dl/g) | 2 | 2 | 2 | 1.99 | 1.99 | 1.99 |
| Ethene content (%) | 10.79 | 10.79 | 10.79 | 13.27 | 13.27 | 13.27 |
| Bulk density (kg/m3) | 417 | 417 | 417 | 420 | 420 | 420 |
| Average particle size (mm) | 2.06 | 2.06 | 2.06 | 2 | 2 | 2 |

TABLE 3

|  | Ex 1 (Co) | Ex 2 | Ex 3 | Ex 4 (Co) | Ex 5 | Ex 6 |
|---|---|---|---|---|---|---|
| 3rd Gas Phase Reactor | | | | | | |
| Temperature (° C.) | 85.02 | 85.02 | 85.02 | 84.98 | 84.98 | 84.98 |
| Pressure (kPa) | 3000 | 3000 | 3000 | 3000 | 3000 | 3000 |
| Propylene feed (kg/h) | 60 | 60 | 60 | 60 | 60 | 60 |
| Propylene concentration (mol-%) | 44.1 | 44.1 | 44.1 | 43.9 | 43.9 | 43.9 |
| Propylene partial pressure (kPa) | 1367.1 | 1367.1 | 1367.1 | 1360.9 | 1360.9 | 1360.9 |
| Ethylene feed (kg/h) | 28.2 | 28.2 | 28.2 | 32.2 | 32.2 | 32.2 |
| C2/C3 ratio (mol/kmol) | 752 | 752 | 752 | 748 | 748 | 748 |
| H2/C2 ratio (mol/kmol) | 232 | 232 | 232 | 234 | 234 | 234 |
| Bed level (cm) | 135 | 135 | 135 | 130 | 130 | 130 |
| Residence time (h) | 1.18 | 1.18 | 1.18 | 1.35 | 1.35 | 1.35 |
| MFR2 (g/10 min) | 25 | 25 | 25 | 19.84 | 19.84 | 19.84 |
| XCS (%) | 29 | 29 | 29 | 34.5 | 34.5 | 34.5 |
| AM (%) | 28 | 28 | 28 | 28.6 | 28.6 | 28.6 |
| Ethene of AM (%) | 48 | 48 | 48 | 47.5 | 47.5 | 47.5 |
| Viscosity of AM (dl/g) | 1.8 | 1.8 | 1.8 | 1.8 | 1.8 | 1.8 |
| Ethene content (wt-%) | 16 | 16 | 16 | 18.7 | 18.7 | 18.7 |
| Bulk density (kg/m3) | 410 | 410 | 410 | 415 | 415 | 415 |
| Product | | | | | | |
| MFR2 (g/10 min) | 25 | 25 | 25 | 19 | 19 | 19 |
| XCS (%) | 29 | 29 | 29 | 35 | 35 | 35 |
| AM (wt-%) | 27.5 | 27.5 | 27.5 | 31.8 | 31.8 | 31.8 |
| Ethene of AM (%) | 47.4 | 47.4 | 47.4 | 47.3 | 47.3 | 47.3 |
| Viscosity of AM (dl/g) | 1.9 | 1.9 | 1.9 | 1.7 | 1.7 | 1.7 |
| Ethene content (%) | 16.7 | 16.7 | 16.7 | 18.9 | 18.9 | 18.9 |
| Particle size >4.0 mm | 0 | 0 | 0 | 0 | 0 | 0 |
| Particle size. sieve 2.0 mm | 43 | 43 | 43 | 43 | 43 | 43 |
| Particle size. sieve 0.841 mm | 48.5 | 48.5 | 48.5 | 48.5 | 48.5 | 48.5 |
| Particle size. sieve 0.354 mm | 6 | 6 | 6 | 6.5 | 6.5 | 6.5 |
| Particle size. sieve 0.250 mm | 1 | 1 | 1 | 1 | 1 | 1 |
| Particle size. sieve 0.105 mm | 1 | 1 | 1 | 1 | 1 | 1 |
| Particle size <0.105 mm | 0.5 | 0.5 | 0.5 | 0 | 0 | 0 |
| PSD avg (mm) | 2 | 2 | 2 | 2 | 2 | 2 |
| Bulk Density (kg/m3) | 420 | 420 | 420 | 419 | 419 | 419 |
| Matrix Powder added (wt-%) | 0 | 1.0 | 2.0 | — | — | — |
| TALC TITAL 10 added (wt-%) | — | — | — | — | 0.3 | 0.5 |
| Flowability (s) | 12.3 | 11.5 | 11 | 14 | 8.3 | 6.6 |

We claim:

1. Method for the preparation of a heterophasic polypropylene (HECO) in a reactor facility, wherein
   (A) the reactor facility comprises in series
      (i) a first reactor system (1st RS) comprising at least a slurry reactor (SR) and/or at least one gas phase reactor (GPR),
      (ii) a first conveying line (CL 1) connecting the first reactor system (1st RS) with a second reactor system (2nd RS),
      (iii) the second reactor system (2nd RS) comprising at least one gas phase reactor (GPR) and an outlet (O),
      (iv) a second conveying line (CL 2) connecting the outlet (O) of the second reactor system (2nd RS) with a purge bin (PB) comprising a feeder (F),
      (v) a conveying system (C) optionally comprising a powder silo (PS),
      (vi) the conveying system (C) being connected with the feeder (F) of the purge bin (PB), and
      (vii) optionally an extruder (E) connected with the conveying system (C),
   (B) the preparation of said heterophasic polypropylene (HECO) comprises the steps in the order of
      (a) producing in said first reactor system (1st RS) the polypropylene matrix (M),
      (b) transferring at least a part of said polypropylene (M) to said second reactor system (2nd RS) via the first conveying line (CL 1),
      (c) producing in said second reactor system (2nd RS) in the presence of said polypropylene (M) the elastomeric copolymer (E) obtaining the heterophasic polypropylene (HECO),
      (d) discharging said heterophasic polypropylene (HECO) from said second reactor system (2nd RS) via the outlet (O),
      (e) transferring said discharged heterophasic polypropylene (HECO) via the second conveying line (CL 2) to said purge bin (PB) comprising said feeder (F), and
      (f) transferring further said discharged heterophasic polypropylene (HECO) from said purge bin (PB) via said feeder (F) to said conveying system (C), optionally to the powder silo (PS) of the conveying system (C),
      (g) optionally extruding the heterophasic polypropylene (HECO) in the extruder (E) to pellets,
   (C) the produced heterophasic polypropylene (HECO) is provided with an additive (A), said additive (A) is fed to the produced heterophasic polypropylene (HECO)
      (α) at the outlet (O) of the second reactor system (2nd RS), and/or
      (β) at the purge bin (PB), and/or
      (γ) at the feeder (F) of the purge bin (PB), and/or
      (δ) at the powder silo (PS), and/or
      (ε) at the second conveying line (CL 2) between the outlet (O) and the purge bin (PB), and/or
      (ζ) at the conveying system (C) between the feeder (F) and the powder silo (PS),
   and
   (D) the produced heterophasic polypropylene (HECO) after being treated with the additive (A)
      (i) has a xylene cold soluble fraction (XCS) of at least 15 wt.-% and (ii) comprises a polypropylene matrix (M) and dispersed therein an elastomeric copolymer (E).

2. Method for the preparation of a heterophasic polypropylene (HECO) in a reactor facility wherein
(A) the reactor facility comprises in series
    (i) a first reactor system ($1^{st}$ RS) comprising at least a slurry reactor (SR) and/or at least one gas phase reactor (GPR),
    (ii) a first conveying line (CL 1) connecting the first reactor system ($1^{st}$ RS) with a second reactor system ($2^{nd}$ RS),
    (iii) the second reactor system ($2^{nd}$ RS) comprising at least one gas phase reactor and an outlet (O),
    (iv) a second conveying line (CL 2) connecting the outlet (O) of the second reactor system ($2^{nd}$ RS) with a purge bin (PB) comprising a feeder (F),
    (v) a conveying system (C) optionally comprising a powder silo (PS),
    (vi) the conveying system (C) being connected with the feeder (F) of the purge bin (PB), and
    (vii) optionally an extruder (E) connected with the conveying system (C),
(B) the preparation of said heterophasic polypropylene (HECO) comprises the steps in the order of
    (a) producing in said first reactor system ($1^{st}$ RS) the polypropylene matrix (M),
    (b) transferring at least a part of said polypropylene (M) to said second reactor system ($2^{nd}$ RS) via the first conveying line (CL 1),
    (c) producing in said second reactor system ($2^{nd}$ RS) in the presence of said polypropylene (M) the elastomeric copolymer (E) obtaining the heterophasic polypropylene (HECO),
    (d) discharging said heterophasic polypropylene (HECO) from said second reactor system ($2^{nd}$ RS) via the outlet (O),
    (e) transferring said discharged heterophasic polypropylene (HECO) via the second conveying line (CL 2) to said purge bin (PB) comprising said feeder (F), and
    (f) transferring further said discharged heterophasic polypropylene (HECO) from said purge bin (PB) via said feeder (F) to said conveying system (C), optionally to the powder silo (PS) of the conveying system (C),
    (g) optionally extruding the heterophasic polypropylene (HECO) in the extruder (E) to pellets,
(C) the produced heterophasic polypropylene (HECO) is provided with an additive (A), said additive (A) is fed to the produced heterophasic polypropylene (HECO)
    ($\alpha$) at the outlet (O) of the second reactor system ($2^{nd}$ RS), and/or
    ($\beta$) at the purge bin (PB), and/or
    ($\gamma$) at the feeder (F) of the purge bin (PB), and/or
    ($\zeta$) at the second conveying line (CL 2) between the outlet (O) and the purge bin (PB),
and
(D) the produced heterophasic polypropylene (HECO) after having left the purge bin (PB) via the feeder (F)
    (i) has a xylene cold soluble fraction (XCS) of at least 15 wt.-% and
    (ii) comprises a polypropylene matrix (M) and dispersed therein an elastomeric copolymer (E).

3. Method according to claim 1, wherein the intrinsic viscosity (IV) of the xylene cold soluble fraction (XCS) of the heterophasic polypropylene (HECO) after having left the purge bin (PB) via the feeder (F) is equal or below 3.0 dl/g measured according to ISO 1628-1 (at 135° C. in decaline).

4. Method according to claim 1, wherein the polypropylene (M) produced in step (a) has a xylene cold soluble fraction (XCS) of not more than 5.0 wt.-%.

5. Method according to claim 1, wherein the polypropylene (M) is a propylene homopolymer.

6. Method according to claim 1, wherein the heterophasic polypropylene (HECO) comprises
80 to 50 wt.-% of the polypropylene matrix (M) and
20 to 50 wt.-% of the elastomeric copolymer (E),
based on the polypropylene matrix (M) and the elastomeric copolymer (E).

7. Method according to claim 1, wherein the elastomeric copolymer (E)
(a) comprises monomer units derived from ethylene and at least another $\alpha$-olefin selected from the group consisting of propylene, 1-butene, 1-pentene, 1-hexene, 1-heptene, 1-octene and mixtures thereof, and/or
(b) the amount of monomer units derived from ethylene in the elastomeric copolymer (E) is at least 20 wt.-%.

8. Method according to claim 1, wherein the amount of additive (A) is equal or below 5.0 wt.-% based on the heterophasic polypropylene (HECO).

9. Method according to claim 1, wherein the additive (A)
(a) has the capability to reduce the stickiness of the sticky surface of the heterophasic polypropylene (HECO) and/or
(b) coats at least partially the surface of the heterophasic polypropylene (HECO).

10. Method according to claim 1, wherein the additive (A) is selected from the group consisting of $\alpha$-olefin polymer, talc, phenolic antioxidant, stearate, silica, synthetic silica, silicate, synthetic zeolite, $CaCO_3$, $MgO$, $Mg(OH)_2$, and mixtures thereof.

11. Method according to claim 1, wherein the additive (A) is a polypropylene.

12. Method according to claim 1, wherein the additive (A) is the polypropylene matrix (M) produced in the first reactor system ($1^{st}$ RS).

13. Method according to claim 1, wherein a side stream (SS) of the polypropylene matrix (M) produced in the first reactor system ($1^{st}$ RS) is used as the additive (A).

14. Method according to claim 13, wherein the side stream (SS) is sidelined from the first reactor system ($1^{st}$ RS) and is fed
($\alpha$) to the outlet (O) of the second reactor system ($2^{nd}$ RS), or
($\beta$) to the purge bin (PB), or
($\gamma$) to the feeder (F) of the purge bin (PB), or
($\delta$) to the powder silo (PS), or
($\epsilon$) to the second conveying line (CL 2) between the outlet (O) and the purge bin (PB), or
($\zeta$) to the conveying system (C) between the feeder (F) and the powder silo (PS).

15. Method according to claim 1, wherein
(A) the reactor facility comprises in series
    (i) a first reactor system ($1^{st}$ RS) comprising at least a slurry reactor (SR) and/or at least one gas phase reactor (GPR),
    (ii) a first conveying line (CL 1) connecting the first reactor system ($1^{st}$ RS) with a second reactor system ($2^{nd}$ RS),
    (iii) the second reactor system ($2^{nd}$ RS) comprising at least one gas phase reactor (GPR) and an outlet (O),
    (iv) a second conveying line (CL 2) connecting the outlet (O) of the second reactor system ($2^{nd}$ RS) with a purge bin (PB) comprising a feeder (F), (v) a conveying system (C) optionally comprising a powder silo (PS),
(vi) the conveying system (C) being connected with the feeder (F) of the purge bin (PB), and
(vii) optionally an extruder (E) connected with the conveying system (C), and additionally the reactor facility comprises a side stream line (SSL) which connects the first reactor system ($1^{st}$ RS) with
   (α) the outlet (O) of the second reactor system ($2^{nd}$ RS), or
   (β) the purge bin (PB), or
   (γ) the feeder (F) of the purge bin (PB), or
   (δ) the powder silo (PS), or
   (ε) the second conveying line (CL 2) between the outlet (O) and the purge bin (PB), or
   (ζ) the conveying system (C) between the feeder (F) and the powder silo (PS),
(B) the preparation of said heterophasic polypropylene (HECO) comprises the steps in the order of
   (a) producing in said first reactor system ($1^{st}$ RS) the polypropylene matrix (M),
   (b) transferring one part of said polypropylene matrix (M), to said second reactor system ($2^{nd}$ RS) via the first conveying line (CL 1),
   (c) producing in said second reactor system ($2^{nd}$ RS) in the presence of said polypropylene matrix (M) the elastomeric copolymer (E) obtaining the heterophasic polypropylene (HECO),
   (d) discharging said heterophasic polypropylene (HECO) from said second reactor system ($2^{nd}$ RS) via the outlet (O),
   (e) transferring said discharged heterophasic polypropylene (HECO) via the second conveying line (CL 2) to said purge bin (PB) comprising said feeder (F), and
   (f) transferring further said discharged heterophasic polypropylene (HECO) from said purge bin (PB) via said feeder (F) to said conveying system (C), optionally to the powder silo (PS) of the conveying system (C),
   (g) optionally extruding the heterophasic polypropylene (HECO) in the extruder (E) to pellets,
(C) the produced heterophasic polypropylene (HECO) is provided with an additive (A) being the remaining part of the polypropylene matrix (M) which has been not transferred to the second reactor system ($2^{nd}$ RS) but has been sidelined via the side stream line (SSL), said additive (A) is fed to the produced heterophasic polypropylene (HECO)
   (α) at the outlet (O) of the second reactor system ($2^{nd}$ RS), or
   (β) at the purge bin (PB), or
   (γ) at the feeder (F) of the purge bin (PB), or
   (δ) at the powder silo (PS), or
   (ε) at the second conveying line (CL 2) between the outlet (O) and the purge bin (PB), or
   (ζ) at the conveying system (C) between the feeder (F) and the powder silo (PS),
and
(D) the produced heterophasic polypropylene (HECO) after being treated with the additive (A)
   (i) has a xylene cold soluble fraction (XCS) of at least 15 wt.-% and
   (ii) comprises a polypropylene matrix (M) and dispersed therein an elastomeric copolymer (E).

16. Method according to claim 15, wherein the reactor facility comprises a side stream line (SSL) which connects the first reactor system ($1^{st}$ RS) with
   (α) the outlet (O) of the second reactor system ($2^{nd}$ RS), or
   (β) the purge bin (PB), or
   (γ) the feeder (F) of the purge bin (PB), or
   (δ) the second conveying line (CL 2) between the outlet (O) and the purge bin (PB),
and the produced heterophasic polypropylene (HECO) is provided with an additive (A) being the remaining part of the polypropylene matrix (M) which has been not transferred to the second reactor system ($2^{nd}$ RS) but has been sidelined via the side stream line (SSL), said additive (A) is fed to the produced heterophasic polypropylene (HECO)
   (α) at the outlet (O) of the second reactor system ($2^{nd}$ RS), or
   (β) at the purge bin (PB), or
   (γ) at the feeder (F) of the purge bin (PB), or
   (δ) at the second conveying line (CL 2) between the outlet (O) and the purge bin (PB),
and
the produced heterophasic polypropylene (HECO) after having left the purge bin (PB) via the feeder (F)
   (i) has a xylene cold soluble fraction (XCS) of at least 15 wt.-% and
   (ii) comprises a polypropylene matrix (M) and dispersed therein an elastomeric copolymer (E).

17. Method according to claim 16, wherein the first reactor system ($1^{st}$ RS) comprises only a slurry reactor (SR) as polymerisation unit and the side stream line (SSL) connects said slurry reactor (SR) with
   (α) the outlet (O) of the second reactor system ($2^{nd}$ RS), or
   (β) the purge bin (PB), or
   (γ) the feeder (F) of the purge bin (PB), or
   (δ) the second conveying line (CL 2) between the outlet (O) and the purge bin (PB).

18. Method according to claim 16, wherein the first reactor system ($1^{st}$ RS) comprises a slurry reactor (SR) and a gas phase reactor (GPR) and the side stream line (SSL) connects said gas phase reactor (GPR) of the first reactor system ($1^{st}$ RS) with
   (α) the outlet (O) of the second reactor system ($2^{nd}$ RS), or
   (β) the purge bin (PB), or
   (γ) the feeder (F) of the purge bin (PB), or
   (δ) the second conveying line (CL 2) between the outlet (O) and the purge bin (PB).

19. Method according to claim 1, wherein the additive (A) is fed via a hopper (H) to
   (α) the outlet (O) of the second reactor system ($2^{nd}$ RS), or
   (β) the purge bin (PB), or
   (γ) the feeder (F) of the purge bin (PB), or
   (δ) the powder silo (PS), or
   (ε) the second conveying line (CL 2) between the outlet (O) and the purge bin (PB), or
   (ζ) the conveying system (C) between the feeder (F) and the powder silo (PS).

20. A method for producing a heterophasic polypropylene (HECO) in a reactor facility comprising the steps of:
(A) providing an additive (A)
wherein
(B) the heterophasic polypropylene (HECO)
   (i) has a xylene cold soluble fraction (XCS) of at least 15 wt.-% and
   (ii) comprises a polypropylene matrix (M) and dispersed therein an elastomeric copolymer (E),
(C) the reactor facility comprises in series
   (i) a first reactor system ($1^{st}$ RS) comprising at least a slurry reactor (SR) and/or at least one gas phase reactor (GPR), (ii) a first conveying line (CL 1) connecting the first reactor system (1$^{st}$ RS) with a second reactor system (2$^{nd}$ RS), (iii) the second reactor system (2$^{nd}$ RS) comprising at least one gas phase reactor (GPR) and an outlet (O), (iv) a second conveying line (CL 2) connecting the outlet (O) of the second reactor system (2$^{nd}$ RS) with a purge bin (PB) comprising a feeder (F), (v) a conveying system (C) optionally comprising a powder silo (PS), (vi) the conveying system (C) being connected with the feeder (F) of the purge bin (PB), and (vii) optionally an extruder (E) connected with the conveying system (C), wherein further (a) in said first reactor system (1$^{st}$ RS) the polypropylene matrix (M) is produced, (b) in said second reactor system (2$^{nd}$ RS) in the presence of said polypropylene (M) the elastomeric copolymer (E) is produced obtaining the heterophasic polypropylene (HECO), (d) said heterophasic polypropylene (HECO) is discharged from said second reactor system (2$^{nd}$ RS) via the outlet (O), (e) said discharged heterophasic polypropylene (HECO) is transferred via the second conveying line (CL 2) to said purge bin (PB) comprising said feeder (F), and (f) said discharged heterophasic polypropylene (HECO) is further transferred from said purge bin (PB) via said feeder (F) to said conveying system (C), optionally to the powder silo (PS) of the conveying system (C), (g) optionally the heterophasic polypropylene (HECO) is extruded to pellets, (D) feeding the additive (A) to the produced heterophasic polypropylene (HECO)

(α) at the outlet (O) of the second reactor system (2$^{nd}$ RS), and/or (β) at the purge bin (PB), and/or (γ) at the feeder (F) of the purge bin (PB), and/or (δ) at the powder silo (PS), and/or (ε) at the second conveying line (CL 2) between the outlet (O) and the purge bin (PB), and/or (ζ) at the conveying system (C) between the feeder (F) and the powder silo (PS), to improve the flowability of the heterophasic polypropylene (HECO) compared to the same heterophasic polypropylene (HECO) but being not treated with an additive (A) at this stage.

21. The method according to claim 20, wherein the additive is selected from the group consisting of α-olefin polymer, talc, phenolic antioxidant, stearate, silica, synthetic silica, silicate, synthetic zeolite, $CaCO_3$, $MgO$, $Mg(OH)_2$, and mixtures thereof.

22. Method according to claim 1, wherein (A) the reactor facility comprises in series (i) a first reactor system (1$^{st}$ RS) comprising at least a slurry reactor (SR) and/or at least one gas phase reactor (GPR), (ii) a first conveying line (CL 1) connecting the first reactor system (1$^{st}$ RS) with a second reactor system (2$^{nd}$ RS), (iii) the second reactor system (2$^{nd}$ RS) comprising at least one gas phase reactor (GPR) and an outlet (O), (iv) a second conveying line (CL 2) connecting the outlet (O) of the second reactor system (2$^{nd}$ RS) with a purge bin (PB) comprising a feeder (F), (v) a conveying system (C) optionally comprising a powder silo (PS), (vi) the conveying system (C) being connected with the feeder (F) of the purge bin (PB), and (vii) optionally an extruder (E) connected with the conveying system (C), and additionally the reactor facility comprises a side stream line (SSL) which connects the first reactor system (1$^{st}$ RS) with (α) the outlet (O) of the second reactor system (2$^{nd}$ RS), or (β) the purge bin (PB), or (γ) the feeder (F) of the purge bin (PB), or (δ) the powder silo (PS), or (ε) the second conveying line (CL 2) between the outlet (O) and the purge bin (PB), or (ζ) the conveying system (C) between the feeder (F) and the powder silo (PS), (B) the preparation of said heterophasic polypropylene (HECO) comprises the steps in the order of (a) producing in said first reactor system (1$^{st}$ RS) the polypropylene matrix (M), (b) transferring one part of said polypropylene matrix (M) to said second reactor system (2$^{nd}$ RS) via the first conveying line (CL 1), (c) producing in said second reactor system (2$^{nd}$ RS) in the presence of said polypropylene matrix (M) the elastomeric copolymer (E) obtaining the heterophasic polypropylene (HECO), (d) discharging said heterophasic polypropylene (HECO) from said second reactor system (2$^{nd}$ RS) via the outlet (O), (e) transferring said discharged heterophasic polypropylene (HECO) via the second conveying line (CL 2) to said purge bin (PB) comprising said feeder (F), and (f) transferring further said discharged heterophasic polypropylene (HECO) from said purge bin (PB) via said feeder (F) to said conveying system (C), optionally to the powder silo (PS) of the conveying system (C), (g) optionally extruding the heterophasic polypropylene (HECO) in the extruder (E) to pellets, (C) the produced heterophasic polypropylene (HECO) is provided with an additive (A) being the remaining part of the polypropylene matrix (M) which has been not transferred to the second reactor system (2$^{nd}$ RS) but has been sidelined via the side stream line (SSL), said additive (A) is fed to the produced heterophasic polypropylene (HECO)

(α) at the outlet (O) of the second reactor system (2$^{nd}$ RS), or (β) at the purge bin (PB), or (γ) at the feeder (F) of the purge bin (PB), or (δ) at the powder silo (PS), or (ε) at the second conveying line (CL 2) between the outlet (O) and the purge bin (PB), or (ζ) at the conveying system (C) between the feeder (F) and the powder silo (PS), and (D) the produced heterophasic polypropylene (HECO) after being treated with the additive (A)

(i) has a xylene cold soluble fraction (XCS) of at least 15 wt.-% and (ii) comprises a polypropylene matrix (M) and dispersed therein an elastomeric copolymer (E).

23. Method according to claim 1, wherein
(A) the reactor facility comprises in series
  (i) a first reactor system ($1^{st}$ RS) comprising at least a slurry reactor (SR) and/or at least one gas phase reactor (GPR),
  (ii) a first conveying line (CL 1) connecting the first reactor system ($1^{st}$ RS) with a second reactor system ($2^{nd}$ RS),
  (iii) the second reactor system ($2^{nd}$ RS) comprising at least one gas phase reactor (GPR) and an outlet (O),
  (iv) a second conveying line (CL 2) connecting the outlet (O) of the second reactor system ($2^{nd}$ RS) with a purge bin (PB) comprising a feeder (F),
  (v) a conveying system (C) optionally comprising a powder silo (PS),
  (vi) the conveying system (C) being connected with the feeder (F) of the purge bin (PB), and
  (vii) optionally an extruder (E) connected with the conveying system (C), and additionally the reactor facility comprises a side stream line (SSL) which connects the first reactor system ($1^{st}$ RS) with
    ($\alpha$) the outlet (O) of the second reactor system ($2^{nd}$ RS), or
    ($\beta$) the purge bin (PB), or
    ($\gamma$) the feeder (F) of the purge bin (PB), or
    ($\delta$) the powder silo (PS), or
    ($\epsilon$) the second conveying line (CL 2) between the outlet (O) and the purge bin (PB), or
    ($\zeta$) the conveying system (C) between the feeder (F) and the powder silo (PS),
(B) the preparation of said heterophasic polypropylene (HECO) comprises the steps in the order of
  (a) producing in said first reactor system ($1^{st}$ RS) the polypropylene matrix (M),
  (b) transferring one part of said polypropylene matrix (M) to said second reactor system ($2^{nd}$ RS) via the first conveying line (CL 1),
  (c) producing in said second reactor system ($2^{nd}$ RS) in the presence of said polypropylene matrix (M) the elastomeric copolymer (E) obtaining the heterophasic polypropylene (HECO),
  (d) discharging said heterophasic polypropylene (HECO) from said second reactor system ($2^{nd}$ RS) via the outlet (O),
  (e) transferring said discharged heterophasic polypropylene (HECO) via the second conveying line (CL 2) to said purge bin (PB) comprising said feeder (F), and
  (f) transferring further said discharged heterophasic polypropylene (HECO) from said purge bin (PB) via said feeder (F) to said conveying system (C), optionally to the powder silo (PS) of the conveying system (C),
  (g) optionally extruding the heterophasic polypropylene (HECO) in the extruder (E) to pellets,
(C) the produced heterophasic polypropylene (HECO) is provided with an additive (A) being the remaining part of the polypropylene matrix (M) which has been not transferred to the second reactor system ($2^{nd}$ RS) but has been sidelined via the side stream line (SSL), said additive (A) is fed to the produced heterophasic polypropylene (HECO)
    ($\alpha$) at the outlet (O) of the second reactor system ($2^{nd}$ RS), or
    ($\beta$) at the purge bin (PB), or
    ($\gamma$) at the feeder (F) of the purge bin (PB), or
    ($\delta$) at the powder silo (PS), or
    ($\epsilon$) at the second conveying line (CL 2) between the outlet (O) and the purge bin (PB), or
    ($\zeta$) at the conveying system (C) between the feeder (F) and the powder silo (PS),
  and
(D) the produced heterophasic polypropylene (HECO) after being treated with the additive (A)
  (i) has a xylene cold soluble fraction (XCS) of at least 15 wt.-% and
  (ii) comprises a polypropylene matrix (M) and dispersed therein an elastomeric copolymer (E).

* * * * *